United States Patent
Barrett et al.

(10) Patent No.: US 8,635,376 B2
(45) Date of Patent: Jan. 21, 2014

(54) COMPUTER SYSTEM INPUT/OUTPUT MANAGEMENT

(75) Inventors: David Michael Barrett, Costa Mesa, CA (US); Erick Crowell, Costa Mesa, CA (US); Bino Joseph Sebastian, Costa Mesa, CA (US); John Peter Waszak, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 318 days.

(21) Appl. No.: 12/486,670

(22) Filed: Jun. 17, 2009

(65) Prior Publication Data

US 2009/0259749 A1    Oct. 15, 2009

Related U.S. Application Data

(63) Continuation-in-part of application No. 11/360,557, filed on Feb. 22, 2006, now Pat. No. 7,716,381.

(51) Int. Cl.
*G06F 3/00* (2006.01)

(52) U.S. Cl.
USPC ............................................... 710/5

(58) Field of Classification Search
USPC ............................................... 710/58
See application file for complete search history.

(56) References Cited

U.S. PATENT DOCUMENTS

| | | | |
|---|---|---|---|
| 5,991,829 A * | 11/1999 | Giorgio et al. | 710/15 |
| 6,026,425 A | 2/2000 | Suguri et al. | |
| 6,421,723 B1 | 7/2002 | Tawil | |
| 6,816,917 B2 * | 11/2004 | Dicorpo et al. | 710/5 |
| 6,950,888 B1 | 9/2005 | Rooney et al. | |
| 7,085,227 B1 * | 8/2006 | Brooks et al. | 370/229 |
| 7,281,167 B2 | 10/2007 | Dubé | |
| 7,286,967 B2 * | 10/2007 | Simes | 702/185 |
| 7,343,410 B2 | 3/2008 | Mercier et al. | |
| 7,716,381 B2 | 5/2010 | Ely et al. | |
| 2004/0153844 A1 | 8/2004 | Ghose et al. | |
| 2007/0208849 A1 | 9/2007 | Ely et al. | |
| 2007/0260728 A1 | 11/2007 | Noble | |

(Continued)

OTHER PUBLICATIONS

Brocade. (2009). Brocade DCFM Enterprise Data Sheet located at http://www.brocade.com/products-solutions/products/fabric-management-software/product . . . , last visited Jan. 26, 2009, one page.
Finisar Corporation. (May 3, 2005). Netwisdom Diagnostics Version 2.0, *Finisar Corporation*, eight pages.
Finisar Corporation. (May 2006). XGIG Expert Data Sheet: Quick Identification and Resolution of SAN Problems with XGIG Expert, *Finisar Corporation*, four pages.
Finisar Corporation. (Sep. 2006). Netwisdom Enterprise ProbeFCX Data Sheet, *Finisar Corporation*, four pages.

(Continued)

*Primary Examiner* — Henry Tsai
*Assistant Examiner* — Juanito Borromeo
(74) *Attorney, Agent, or Firm* — McAndrews, Held & Malloy, Ltd.

(57) ABSTRACT

The collection of performance data at multiple servers in a SAN and forwarding that data to a centralized server for analysis is disclosed. Remote agents and a central server application collect specific interesting negative event data to enable a picture of the operational health of the SAN to be determined. The agents are placed in servers having HBAs acting as initiators. The agents interact with the HBAs through a driver stack to collect event data. Because of the initiator function they perform, HBAs have visibility to parts of the network that other entities do not have access to, and thus are ideal locations for gathering event data. A SAN diagnostics manager then pulls the collected data from each agent so that a "picture" of the SAN can be developed. In addition to collecting initiator data, the agents also collect errors and performance data from the OS of the servers.

103 Claims, 9 Drawing Sheets

(56) References Cited

U.S. PATENT DOCUMENTS

2008/0002576 A1* 1/2008 Bugenhagen et al. ........ 370/229
2008/0104356 A1 5/2008 Nagai et al.
2008/0181129 A1 7/2008 Beyers et al.

OTHER PUBLICATIONS

Finisar Corporation. (Oct. 2006). Netwisdom Express Data Sheet, *Finisar Corporation*, four pages.

Finisar, Inc. (2004). "Monitoring and Troubleshooting Storage Networks Using NetWisdom," *Finisar, Inc.*, p. 1-6.

Mann, S. (Jan. 2009). "NetWisdon SAN I/O Intelligence: Virtual Instruments," *Butler Group*, eight pages.

Tek-Tools Software. (2009). Profiler: End-to-End IT Visibility, located at http://www.tek-tools.com, 22 pages.

* cited by examiner

COMPUTER SYSTEM INPUT/OUTPUT MANAGEMENT

CROSS-REFERENCE TO RELATED APPLICATIONS

This is a Continuation In Part (CIP) of U.S. application Ser. No. 11/360,557, filed on Feb. 22, 2006, the contents of which are incorporated by reference herein in their entirety for all purposes.

FIELD OF THE INVENTION

Embodiments of the present invention relate generally to the collection of event and performance data at one or more servers in communications infrastructures such as a Storage Area Network (SAN) and forwarding that data to a network diagnostics manager where the data can be analyzed and adjustments made to the SAN to improve its performance, referred to herein as input/output (I/O) management.

BACKGROUND OF THE INVENTION

In modern data centers, business data is often stored within networked storage systems. These storage systems, typically disk arrays, are usually connected to a fast, reliable and low latency SAN. Servers needing access to this data may also be connected to the SAN using a Host Bus Adapter (HBA), Network Interface Card (NIC), or other similar adapter or interface device (generally referred to herein as an Input/Output (I/O) controller). The disk arrays in the SAN can be presented as Small Computer System Interface (SCSI) disks to the Operating System (OS). The SCSI disks are, in turn, either presented up to an application running in the server as a File System or a raw disk device. The OS and applications running on the server may access the SAN storage array as a disk connected to the server.

In today's increasingly data-driven and competitive business environment, fast, efficient, error-free storage and retrieval of data is often critical to business success. The use of SANs has become widespread as the ability to store and retrieve massive amounts of data from a large number of storage devices over a large geographic area is now becoming a business necessity. Not surprisingly, the ability to quickly identify and fix problems and bottlenecks in storing and retrieving data across a SAN is a goal of any such storage system.

However, SAN errors and bottlenecks are often difficult to diagnose, and can be caused by subtle interactions with seemingly unrelated devices. For example, in the vast majority of installations today, the SCSI protocol is layered on top of the network protocol. As a result, the OS issues SCSI commands to the storage array to access data and control the storage arrays. Two types of commands are issued to the storage array. Data commands (e.g., read, write, report Logical Unit Number (LUN or, more simply, LU), and the like) are issued by the OS to access data stored in the storage array. Task management commands (e.g., target reset, LUN reset, etc.) are issued to control the command queues of the storage system. The task management commands issued by one server to a storage array can affect data access commands from another server to the same storage array. This also means the action of one server connected to a storage array can cause an error on another server connected to same storage array.

Like all networks, discovery- and link-related events can occur in the SAN that lead to availability and/or performance problems. Due the complexity of the SAN protocols involved and the size of the SANs in today's world-class data centers, it is essential to have tools to help quickly identify the root cause of any network or storage connectivity issues. However, the solutions that exist today, under the umbrella of SAN management software, do not provide the required information to quickly, if ever, determine root causes.

When a network problem is detected, some existing solutions can allow a server configured as an initiator to enter a debug or diagnostics mode. In such a diagnostics mode, agents can be employed to collect massive amounts of counter information and protocol event data (SCSI events, Fibre Channel (FC) events, discovery events, and the like) related to the fabric and target at each HBA and store the collected data in a system log file. However, the counters only provide information about the performance of a particular HBA or switch port (e.g., the amount of data passing through an HBA, the number of data packets sent, received, etc.), but do not provide a "big picture" of what is happening in the overall network. Counters are good at showing trends but are not effective, and sometimes misleading, when attempting to determine root causes of SAN availability or performance issues. The high-level event data is also generally limited to information about events seen at a particular HBA or switch port (e.g., a notification that a network component was inserted or removed, etc.), but as with the counter information, it does not provide a "big picture" of what is happening in the overall network. High-level events are also problematic in helping determine root causes, because they can often be intentionally induced by the end-user, or simply a symptom of a problem created by a root cause existing elsewhere.

Furthermore, this type of intensive data collection represents an overhead burden that affects the performance of the system because the system is still operating while the massive amount of event data is being collected. In addition, the mere act of operating in a diagnostics mode can mask the problem. Moreover, the mere collection of data does not provide any insight into the problem. The system log file must be reviewed, and the data collected at the time the performance issues were occurring must be interpreted in an attempt to diagnose the problem.

Today's SAN Management tools rely on counter and event information because that is all that is available to them. Protocol information (e.g. network protocol and SCSI protocol information) is much more valuable for uncovering root cause, but this information is typically locked up in the network devices and never exposed.

Some existing network diagnostics tools do not require special hardware placed at various locations throughout the network. Such tools communicate with the fabric switches (each of which has a Simple Network Management Protocol (SNMP) agent running inside it) using the SNMP protocol, and gather high level counter data (e.g., how many bytes have been transmitted in the last hour, the number of read commands in the last hour, etc.). However, this data is generally uninteresting, because the fabric is usually able to move all Input/Output (I/O) commands being demanded of it. Furthermore, when events happen at the fabric or process level, an endpoint (initiator or target) no longer sends any commands. The lack of activity detected by the counters indicates there may be a problem, but the type of problem is unknown.

Other existing SAN diagnostics tools require special hardware (e.g. deep analyzers) to be placed at various locations around the network to collect data and generate reports. Often, because this hardware is expensive, a single (or a few) hardware analyzer(s) must be moved around from HBA to HBA to gather needed data. However, the data collected by such hardware solutions also cannot develop a big picture of the network.

Some network switches have an option where a port can be directed to send information to analyzer hardware within the switch. Additional hardware external to the switch then encapsulates the information into Ethernet frames that can be read with dedicated software. This type of hardware solution represents another hardware add-on that provides for the viewing of lower level protocol items. It does this by extracting portions of the packets that the switch may not normally extract for the purpose of collecting the information, and does so only on a single port at a time. After the initiator stack obtains this information from the target and fabric, the information can be interpreted. However, in response to this information, the initiator can only control its own operation (e.g., not send as much data, try another route, etc.). Moreover, the initiator does not keep a "scorecard" of this information for diagnosing network performance issues.

In addition to the SAN diagnostics tools mentioned above, current HBA management tools can also provide some diagnostics capabilities. For example, Emulex Corporation's HBAnyware™ management suite, in its current configuration, keeps track of how HBAs are performing, how they are configured, enables HBAs to be configured remotely, and allows reports to be sent to remote locations on the network. HBAnyware™ is disclosed in U.S. application Ser. No. 10/277,922, filed on Oct. 21, 2002, the contents of which are incorporated herein by reference. The functionality of HBAnyware™ resides in HBA device drivers, but remote user space agents in the HBAs are also needed to perform the management functions.

HBAnyware™ collects configuration information about the HBAs using agents in the remote servers (HBAs) and causes the HBAs to be configured for different sizes and behaviors. HBAnyware™ communicates with the remote servers both in-band and out-of-band. With HBAnyware™, the HBA drivers in the remote servers communicate with each other to allow centralized management of the SAN and configuration of HBA hardware at a central point. For example, if HBAnyware™-compatible hardware is located somewhere in the SAN, it can be discovered by the HBAnyware™ software. Messages can be sent to and received from the HBAnyware™-compatible hardware that cause the firmware in the hardware to be updated, enable the configuration of the LUNs in the network, etc. All of this can be done from a central location rather than requiring each server to separately configure its own HBA.

HBAnyware™ can also collect some types of diagnostics information. With HBAnyware™, the agents collect data from the stack, but only data local to the HBA (e.g. link up, link down) is collected. Counter data is collected from the HBAs, but it is generally uninteresting, and no lower level protocol events, no latency data, and no capacity information is collected. Moreover, HBAnyware™ does not integrate the collected information into a system view.

Therefore, there is a need to collect specific interesting negative event data, along with command latency and system capacity data, to enable a picture of the operational health of the SAN to be determined and quickly identify the root cause of SAN problems.

Even in the absence of catastrophic SAN errors, SAN performance can be critical to business success. Therefore, reducing the time it takes to store and retrieve data across a SAN is always a goal of any such storage system.

FIG. 1 illustrates an exemplary conventional SAN 100 including a host computer 102, a fabric 104, a target 106 and one or more Logical Units (LUs) 108, which are actually logical drives partitioned from one or more physical disk drives controlled by the target's array controller. The host computer 102 includes an initiator 110 such as a Host Bus Adapter (HBA) or I/O controller for communicating over the SAN 100. A representative application 112 is shown running on the host computer 102. The fabric 104 may implement the Fibre Channel (FC) transport protocol for enabling communications between one or more initiators 110 and one or more targets 106. The target 106 acts as a front end for the LUs 108, and may be a target array (a single controller with one or more ports for managing, controlling access to and formatting of LUs), Just a Bunch Of Disks (a JBOD) (a collection of physical disks configured in a loop, where each disk is a single target and a LU), a Switched Bunch Of Disks (SBOD®), or the like. An example of a conventional target array is an EMC Symmetrix® storage system or an IBM Shark storage system.

In the example of FIG. 1, the application 112 may employ a file system protocol and may initiate read or write I/O commands 114 that are sent out of the host 102 through the initiator 110 and over the fabric 104 to target 106, where data may be read from or written to one or more of the LUs 108. When an I/O command 114 is transmitted, there is an expectation that the I/O command will be completed, and that it will be completed within a certain period of time. If the read or write operation is completed successfully, an I/O command completion notification 116 will be delivered back to the application 112. At other times, however, if a target 106 or LU 108 is overloaded or malfunctioning, the I/O command may not complete, and no I/O command completion notification 116 will be sent back to the application 112. In such a situation, the only feedback received by the application 112 may be an indication that the I/O command timed-out, and a reason code providing a reason for the timeout.

To assist a SAN system administrator in identifying problem targets 106 or LUs 108 and maintaining an efficient SAN with a balanced and fair LU workload, it is desirable to know the average I/O command completion time for I/O commands sent to each LU 108 in a target 106. In particular, it would be desirable for a system administrator to receive continuously updated LU-specific average I/O command completion time information for each LU in each target the initiator discovered in a dynamic manner. Such information would enable the system administrator to identify where latencies are being injected into the SAN or identify latencies that are worsening, and make adjustments accordingly. For example, if the average I/O command completion times for two different LUs 108 in the same target 106 are drastically different, for a similar I/O pattern and RAID level (e.g. greater than 25% difference), this may be an indication that the LUs are unbalanced and that there is some unfairness at the target, and that perhaps the LU loads need to be re-balanced to achieve a greater degree of fairness. On the other hand, if the average I/O command completion times for all LUs 108 at a target 106 are rising, over time, and becoming too high, this may be an indication that the target is receiving too many I/O requests and that more storage needs to be added so that some data can be shifted to the new target. In other words, it is desirable for the application to detect unfairness among LUs and/or overloaded conditions at a particular target.

However, conventional fabric-attached storage solutions do not provide average I/O command completion time information for an initiator 110 and target 106 in a SAN 100, or for multiple initiators and targets in a SAN. Conventional systems either do nothing, or wait for an initial I/O command failure to occur before taking corrective action such as limiting the outstanding I/O count. The problem with this approach is that by the time the storage device provides an indication that a problem exists, it may be too late to influence the storage device or it may become very expensive to react from an application point of view.

It should be noted that for directly attached and controlled storage such as conventional parallel Small Computer System Interconnect (SCSI) systems where the storage is directly connected to the host without an intervening target array, tools do exist for calculating the I/O command completion time for a particular I/O command and an average I/O command completion time, such as iostat-v, sysstat version 5.0.5, © Sebastien Godard, the contents of which are incorporated by reference herein. In such systems, a statistics counter in the SCSI layer keeps track of I/O command completion times, and monitoring tools within the operating system display this parameter. However, the average I/O command completion time is merely an information-only health indicator, because directly-attached storage systems by their very nature cannot make use of this information to adjust storage allocations and improve the response times of I/O commands.

Therefore, there is also a need to compute average I/O command completion times on a per-LU, per-target basis within a fabric-attached storage system to enable a driver within a host, or a system administrator, to make adjustments to improve the efficiency of the SAN.

One of the causes of increased latency in the execution of I/O commands in SANs is the oversubscription of resources. The responsiveness of devices such as a disk array is a function of the queue depths of queues in their associated production servers and the handling capacity of their storage array ports. Therefore, reducing problems associated with the oversubscription of resources across a SAN is always a goal of any storage system.

In today's datacenters, queue depth is one of the "knobs" available to the storage administrator to balance the system. When managing queue depths, a SAN can be thought of in terms of many other queuing problems. The SAN has a fixed I/O handling capacity, and that capacity needs to be shared by all the applications that are demanding I/O.

Today's SAN Management solutions focus on the capacity issue being in the fabric itself, or the disk capacity at the array. For example, Storage Resource Management (SRM) captures and reports, separately, SAN Management data (link utilization, for example) for switches and Storage Management data (primarily storage capacity) for arrays. However, the fabric is rarely the I/O capacity bottleneck. More often, the bottleneck is either at the server or at the storage controller. At the server, I/O handling capacity depends on a number of factors, including memory availability, kernel architecture, and Central Processing Unit (CPU) power. At the storage controller, I/O handling is also dictated by a number of factors, including the system architecture, the controller front-end, the amount and speed of cache, the controller back-end, and the actual disks themselves. When there are performance issues that need to be managed with queue depths, administrators are forced to use a completely manual process today.

Managing performance issues requires an understanding of the current mapping of initiators to target ports and back-end devices. In addition, understanding the queue depth demand of every initiator, the I/O handling capability of the storage controllers, and an understanding of the actual queue demand placed on the system by every initiator is highly desirable. All of this information must be put together to help understand where the performance issue is, and what areas can be leveraged to mitigate or eliminate the performance issue. Putting together this information is becoming more difficult in today's data centers. With virtual server technology, more queuing demand is placed on storage controllers by fewer initiators and servers. Further, the mapping of all the queue demand to the storage controllers is more difficult to discern and aggregate.

Therefore, there is also a need to quickly and easily obtain capacity information for resources in the SAN to determine when oversubscription is becoming a problem and to initiate fixes to alleviate the oversubscription.

SUMMARY OF THE INVENTION

Embodiments of the present invention relate generally to the collection of event and performance data at one or more servers in communications infrastructures such as a SAN and forwarding that data to a network diagnostics manager where the data can be analyzed and adjustments made to the SAN to improve its performance, referred to herein as I/O management.

One embodiment of the present invention relates to the use of remote agents and a central server application for collecting specific interesting negative event data (diagnostics data) to enable a picture of the operational health of the SAN to be determined. To better identify problem areas in the network, agents are placed in servers having HBAs, NICs, or other adapters (I/O controllers) acting as initiators. The agents interact with relatively inexpensive HBAs in the servers through a driver stack to collect event data. Because of the initiator function they perform, HBAs have visibility to parts of the network that other entities do not have access to, and thus are ideal locations for gathering event data. A SAN diagnostics manager located in one or more management servers then pulls the collected data from each agent so that a SAN diagnostics manager can piece together a "picture" of the SAN that an individual server would not ordinarily be able to see. In addition to collecting initiator data, the agents can also collect errors and performance data (e.g., throughput problems, etc.) seen at the HBAs from the OS of the servers.

Unlike conventional SAN diagnostics tools, the agents according to embodiments of the present invention are (1) nondisruptive, (2) capable of being activated when needed, (3) selectively configurable to look for only a certain number of data items and store them in memory, and (4) configured for periodically sending this information back to a central location so that a picture of what is happening in the SAN can be developed. Although the information being collected at any one particular HBA by itself may not by itself be enlightening to overall network performance, the collection of information being gathered by a number of HBAs can reveal the trouble spots in the network.

Furthermore, unlike conventional software-based SAN diagnostics tools that are only able to collect counter information and/or high-level event data, embodiments of the present invention are able to collect protocol-based negative event data such as error messages and observational performance information received by initiators from the targets.

In addition, unlike conventional SAN diagnostics tools that create performance degradation due to their collection of massive amounts of data, embodiments of the present invention can cause little or no additional performance degradation by being configurable to collect only a relatively small amount of interesting negative event data.

Moreover, unlike conventional SAN diagnostics tools that collect only numeric counter data unassociated with time except as to when the counters were read, embodiments of the present invention collect "stateful" event information having a temporal component. In addition, because counters do not provide time information, they must be monitored constantly, which can have a negative performance impact.

Conventional SAN diagnostics tools can only provide counter data indicating, for example, the number of bytes being received by an HBA, with no visibility at the driver level. However, embodiments of the present invention can make requests of the driver itself, such as observed performance indications (e.g., a latency timer that starts when the request is made and stops when a completion message is received). These performance indications can reveal previously undetectable performance issues at the driver level.

Also, unlike conventional hardware-based SAN diagnostics tools that must be moved around from HBA to HBA and cannot develop a big picture of the network, embodiments of the present invention do not require hardware, just downloadable drivers, APIs and agents, and can collect the specific kind of data needed to develop a big picture of the network.

Furthermore, unlike HBAnyware, which only collects configuration information about the HBAs, the data collected according to embodiments of the invention, although collected by the initiator driver stack, doesn't relate to the initiator but relates to other parts of the network such as the switches or the targets.

A further embodiment of the present invention relates to the computation of an oversubscription value based on the demand for a device divided by the handling capacity of the device to help determine whether the device is oversubscribed and changes need to be made. A still further embodiment of the present invention relates to collecting and logging certain types of event data in a database in a centralized management server, and computing a system severity value indicative of the level of impact (criticality or severity) of each event.

DETAILED DESCRIPTION OF THE PREFERRED EMBODIMENT

Figure 1:
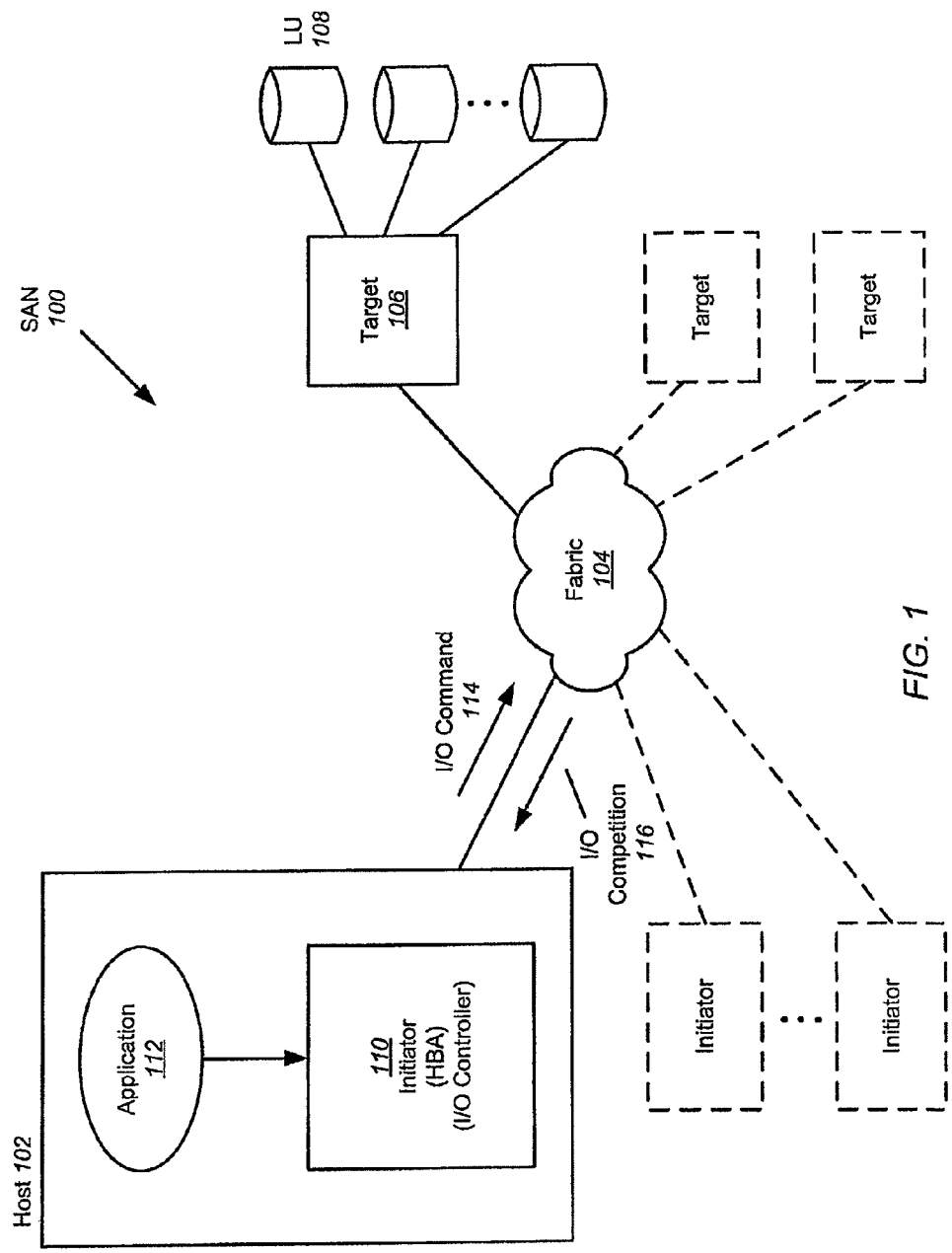
FIG. 1 illustrates an exemplary conventional SAN including an initiator for sending an I/O command, a fabric, and a target for the I/O command including one or more LUs.

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention relate generally to the collection of data at one or more servers in a SAN and forwarding that data to a network diagnostics manager where the data can be analyzed and adjustments made to the SAN to improve its performance.

One particular embodiment of the present invention relates to the processing of I/O commands across the SAN, and more particularly, to the determination of I/O command completion times and average I/O command completion times (latency) per logical driver in a SAN to enable optimization of storage allocations and improve I/O command completion times. Another particular embodiment of this invention relates to the use of remote agents embedded in initiators and a network diagnostics manager application for collecting specific interesting negative event data (diagnostics data) to enable a picture of the operational health of the SAN to be determined. A further particular embodiment of the present invention relates to the computation of an oversubscription value based on the demand for a device divided by the handling capacity of the device to help determine whether the device is oversubscribed and changes need to be made. A still further particular embodiment of the present invention relates to collecting and logging certain types of event data in a database in a centralized management server, and computing a system severity value indicative of the level of impact (criticality or severity) of each event.

Each of these embodiments will be described in greater detail below. Note that although embodiments of the invention may be described herein in the context of SANs, or more generally in the context of networks, it should be understood that embodiments of the invention are also applicable to other types of communications infrastructures, such as Network Attached Storage (NAS), High-Performance Computing, standard network traffic, and the like.

Collection of Latency Information

The first embodiment of the present invention to be described in greater detail relates to the determination of I/O command completion times and average I/O command completion times (latency) per logical driver in a SAN to enable optimization of storage allocations and improve I/O command completion times. It should further be understood that although embodiments of the present invention are described herein in terms of SCSI upper layer transport protocols and FC lower layer transport protocols for purposes of illustration only, embodiments of the present invention are applicable to other upper and lower layer transport protocols. Note also that embodiments of the present invention are not limited to fabric-attached storage, but apply to any SAN topology discoverable by the present invention, be it hub-based, arbitrated-loop based, or fabric based.

Figure 2:
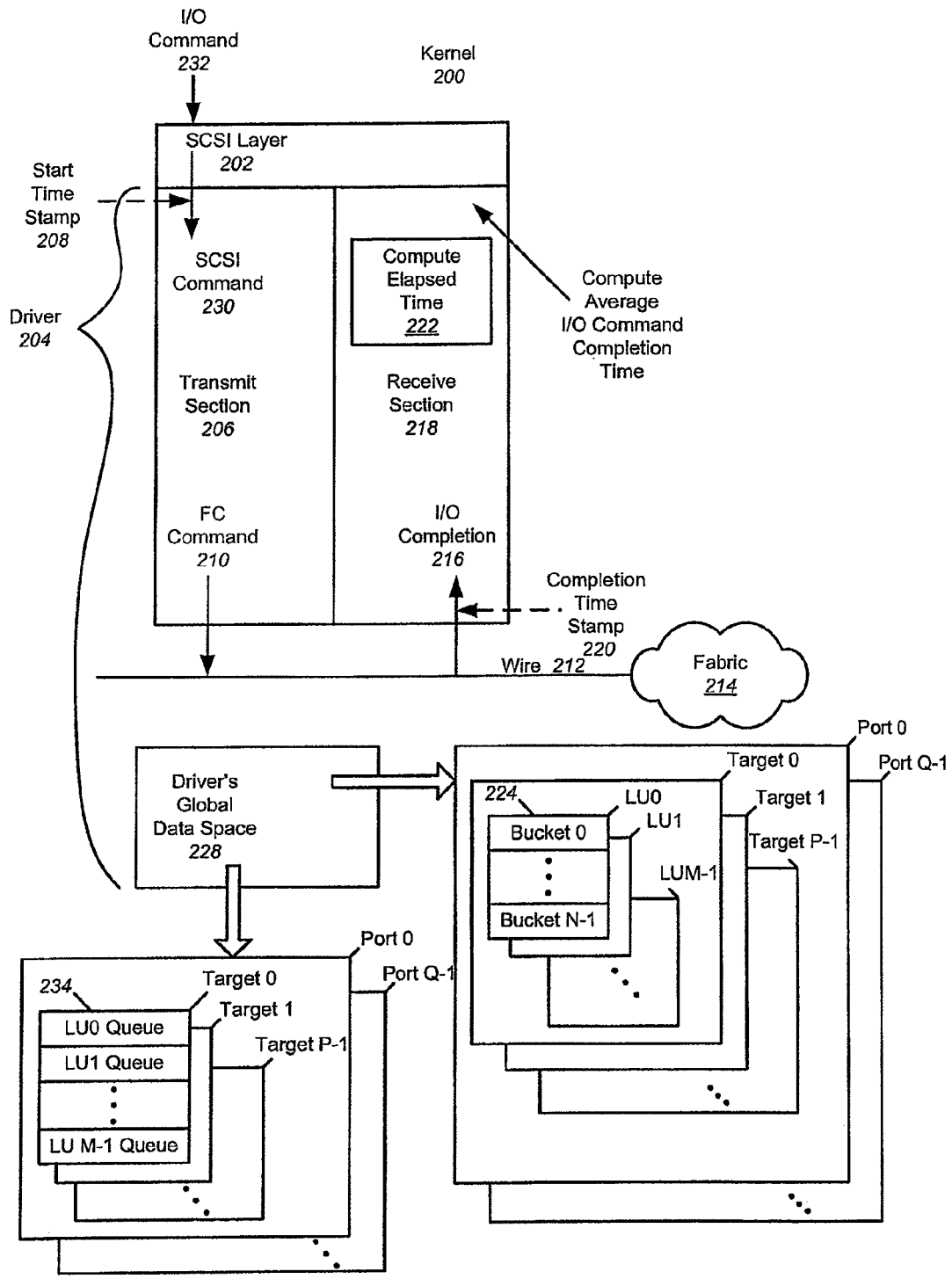
FIG. 2 illustrates an exemplary kernel within a host computer for determining I/O command completion times according to embodiments of the present invention.

FIG. 2 illustrates an exemplary kernel 200 within a host computer for computing I/O command completion times and average I/O command completion times according to embodiments of the present invention. The kernel 200 is the essential center of the host operating system, the core that provides basic services for all other parts of the operating system. The kernel 200 may include an upper transport protocol layer such as SCSI layer 202 and a lower transport protocol driver layer 204. The driver 204 may include a transmit section 206, a receive section 218, and global data space 228. The driver's global data space 228 may store driver configuration data, buckets 224 for each LU, and a queue 234 for each LU, described in further detail below.

Every time an I/O controller port is discovered, the host operating system calls the driver 204, which allocates a block of storage or data structure within its global data space 228 representing that port instance, and assigns a target pointer to that block of storage. Because an I/O controller may contain more than one port, and the driver maps each I/O port to a target, the driver monitors multi-ported I/O controllers the same as single-port I/O controllers. This approach maintains target/port independence. In other words, the driver does not try to figure out whether two or more targets belong to a single I/O controller. FC discovery provides for target discovery only, and targets are not subordinate to each other. Therefore a multi-port array looks like multiple targets to the driver's discovery engine, just like a JBOD with four disks is discovered as four targets. Embodiments of the present invention track this raw data just the same, allowing upper layer applications to "link" target/LU disturbances together with additional knowledge of the SAN topology.

To compute average completion time on a per-LU, per-target and per port basis, the driver 204 must store statistics about the completion times for a number of I/O command completions on a per-LU, per-target, per-port basis. Therefore, in embodiments of the present invention, the driver may allocate "buckets" (memory locations) within its global data space 228 for storing a count of the number of I/O commands that completed within a particular range of time. For example, one bucket may keep track of the number of I/O commands that took between 0.0 and 10.0 ms to complete, another bucket may keep track of the number of I/O commands that took between 10.0 and 20.0 ms to complete, another bucket may keep track of the number of I/O commands that took between 20.0 and 30.0 ms to complete, and so on. Bucket sizes may be fixed by the driver 204, or may be specified by the system administrator when the driver is loaded. Each bucket 224 corresponds to a particular LU, target and port. In the example of FIG. 2, N buckets are allocated for each of M LUs, and this two-dimensional array may be repeated for P targets and Q ports. Thus, a three-dimensional per-LU, per-target, per-port histogram array is stored in the driver's global data space 228.

The buckets 224 are accumulators, so they are not normally reset. Eventually, they may wrap back to zero, so embodiments of the present invention may keep track of when the count in each bucket wraps around. For example, if the total count in an N-bit bucket is $2^N$, and it has wrapped twice, the driver must recognize that the count in the bucket is $2 \times 2^N$ plus whatever count is in the bucket at the time the computation is performed. One way that wrapping could be estimated is to keep track of the previous count and compare it to the new count. If the new count is lower, then it is assumed that the bucket count wrapped once. Alternatively, the driver could reset the bucket counts when an overflow condition is encountered, or the driver could issue a signal or trap to the application indicating an overflow, and the application could initiate a reset.

In the example of FIG. 2, I/O commands 232 from an application being executed by the host are received by the upper SCSI layer 202 (see block 300 of FIG. 3) and passed down to the transmit section 206 of driver 204 as SCSI commands 230. The transmit section 206 time stamps a start time of the SCSI command 230 (see reference character 208 in FIG. 2 and block 302 in FIG. 3) and embeds the time stamp into a transport protocol data structure such as a FC command 210 that encapsulates the SCSI command. The FC command 210 is then sent out over wiring 212 to the FC fabric 214 (see block 304 in FIG. 3). Note that "wiring," as referred to herein, is intended to encompass any transmission media, including copper, fiber, and other media. However, it should be noted that the timestamp does not go out on the wiring 212. The FC command 210 that encapsulates the SCSI command and timestamp includes some data fields (including the timestamp field) that do not leave the kernel memory allocated and managed by the driver. When an I/O command completion 216 representing the completion of the original SCSI command is received from the fabric 214 in the receive section 218 of the driver 204 (see block 306 in FIG. 3), the receive section 218 fetches and records the completion time 220 at which the I/O command completion 216 was received (see block 308 in FIG. 3). The receive section 218 then computes an elapsed I/O command completion time (net round trip completion time from transmit to receive) 222 based on the difference between the timestamped SCSI command start time 208 extracted from within the I/O command completion 216 and the recorded completion time 220 (see block 308 in FIG. 3). Every time an I/O command completion time 222 is computed for a particular LU and port, the count in the appropriate bucket 224 (based on the I/O completion time) is incremented (see block 310 in FIG. 3). The buckets therefore maintain a count of the number of I/O commands completed and a distribution of all completion times. The count in the buckets may form a bell curve, or may form two different spikes, one for reads and one for writes, with the read times being much shorter than the writes. The relative position of these spikes to each other depends on the nature of the I/O mix and how the storage is set up (e.g., RAID, RAID1 or RAID5). The count can be used to compute an average I/O command completion time for a particular LU.

The I/O command completion time measurement is based on a clock in the host, and utilizes high resolution timers in the operating system that resolve to milliseconds at least. Thus, at a relatively low layer in the host, the driver 204 keeps track of the time from when the driver sent an I/O command to the time it receives an acknowledgement of the completion of that I/O command, all the way back through the network from the LU. In other words, it is the entire round trip time from the driver's perspective.

Note that unlike conventional operating system facilities, which measure I/O command completion times at higher layers in the protocol stack, the I/O command completion time measurement according to embodiments of the present invention is performed by the lower transport protocol driver layer 204. In particular, embodiments of the present invention track the I/O command completion times in the driver 204 from the time the SCSI layer 202 gives the SCSI command 230 to the driver to the time the driver receives the I/O completion 216. The I/O command completion times therefore take into account all of the transport layer latency and overhead without injecting continued SCSI layer file system application thread transitions to user space into the completion time. The measurements are more accurate because the delays due to higher level processing are not included.

Figure 3:
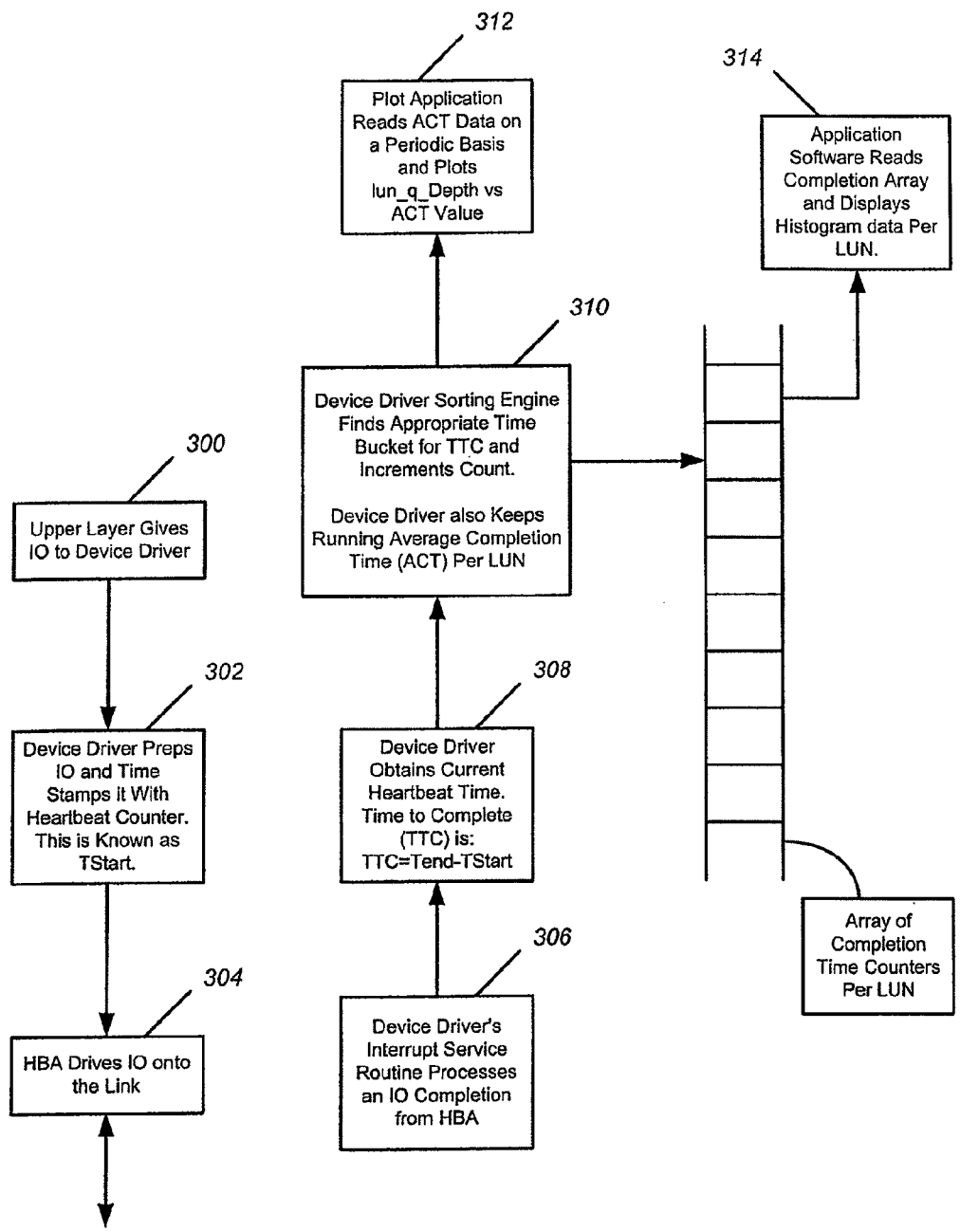
FIG. 3 illustrates an exemplary flowchart describing the determination of I/O command completion times according to embodiments of the present invention.

Once an I/O command completion time has been computed and the appropriate bucket has been incremented, the receive section 218 may then compute an updated average I/O command completion time for the particular LU and port (see block 310 in FIG. 3). The average I/O command completion time for a LU can be computed by multiplying the average I/O command completion time represented by a particular bucket 224 by the count in each bucket (e.g. a 0-10 ms bucket with a count of 10 would be 5 ms×10=50 ms). The product of each multiplication for each bucket associated with that LU is then summed. The sum is then divided by the sum of the counts in all of the buckets for that LU to produce the average I/O command completion time for that LU. This computation is repeated for all LUs in each target and for all ports.

Alternatively, raw data such as the bucket counts may be sent to a higher layer, and the computation of average I/O command completion times may be performed at this higher layer. The buckets and/or average I/O command completion times may also be made available to upper layer applications for display to system administrators via a host-provided Application Programming Interface (API). This host-provided API typically receives data at its bottom edge from the driver while exporting a callable interface at its top edge for applications. The data may also be used to make histogram plots that aid in early warning detection and usage patterns on the storage device (see block 312 in FIG. 3). In addition, if a higher level application wants to read the histogram data, it may request a target 1 pairing, and the driver would index into its private data structure, access it in its entirety, and return it back up to the application (see block 314 in FIG. 3).

In conventional systems, system administrators may wish to limit the storage system's configuration in advance of an overload (e.g. dropped I/O commands) to prevent overload from ever occurring. Overloading is an indication of an over-subscribed target. However, in conventional systems this must be done without the assistance of any monitoring data. Utilizing embodiments of the present invention, that effort could be reduced as each system communicating with the storage device would automatically detect average I/O command completion time trend increases and throttle back the outstanding I/O commands for each LU in a target. In particular, after the average I/O command completion time information is computed and stored, the information may be evaluated by the driver to determine if certain conditions exist that require automatic intervention. For example, embodiments of the present invention may detect overloading (average I/O command completion time for a LU approaching an upper limit, or I/O commands failing altogether). This upper limit may represent a predetermined time interval from a maximum allowable I/O command completion time specified by the upper layers, both of which may be a default value that may also be configurable by the system administrator.

As mentioned above, a queue 234 may be maintained in the driver's global data space 228 for each LU in each target for each port. This queue 234 holds outstanding (pending and incomplete) I/O commands for that LU. The depth of the queue 234 may be controllable at the SCSI layer of the initiator. Adjusting the queue depth serves to control the number of outstanding I/O commands for each LU.

In embodiments of the present invention, the receive section 218 may not only generate per-LU average I/O command completion times, as described above, but may also be able to do something with it, such as throttling back the per-LU queue depth. For example, suppose that the receive section 218 detects that a LU's average I/O command completion time is moving out too far (increasing over time towards the upper limit). Upon detecting an average I/O command completion time that is in danger of increasing beyond this upper limit, the driver's receive section 218 can upcall the midlayer (call into the operating system), and from the SCSI layer 202, lower the number of outstanding I/O commands to that LU by reducing the queue depth for that LU (by half, for example), until the LU recovers, as indicated by a reduction in the average I/O command completion time. The amount that the queue depth is lowered may be configurable by the system administrator. The effect of lowering the maximum number of incomplete I/O commands is that it increases the probability that the LU will actually respond and complete the I/O commands because it is not as overloaded. There is a better chance that the LU will complete the I/O commands rather than having them timeout and require error handling from activating in the upper layers of the system. In addition, multipathing configurations benefit from timely completion of I/O commands rather than error handling as multipathing configurations typically have to maintain command retry state that pressures system resources.

Alternatively, the queue depth can be lowered for all LUs in the target. This blanket approach serves to protect against the starvation of LUs and provide fairness to all LUs so that LUs with a high number of I/O command completions are throttled as well as those LUs that are starved. If, after lowering the queue depth for all LUs, the average I/O command completion time for a particular LU is still too high, the queue depth for all LUs in the target can be repeatedly lowered, as necessary, until a lower limit is reached. The lower limit, which may be configurable by the system administrator, is preferable as opposed to lowering the allowable number of outstanding I/O requests to reach zero because it is desirable to have some amount of I/O commands queued up so it is possible to evaluate how well the LU is doing. If the condition causing the high average I/O command completion time is transient, the LU will recover quickly. If the condition is more continuous in nature, the LU will recover slowly, or may not recover at all.

If the average I/O command completion time starts to improve (drop) to some acceptable threshold, the driver can automatically perform step increases to the LU queue depth for all LUs in the target. The queue depth can eventually be raised until it is back to the initial depth that the driver was initialized with. The step increases may be configurable by the driver, and are useful to prevent overload conditions from being reintroduced if the condition causing the high average I/O command completion times is continuous in nature.

If the array does not recover even after the corrections, the target may simply be oversubscribed, and it may be necessary to expand the number of LUs in the target, or redirect some of the data out to a new target. Being oversubscribed is relative—cutting the queue depth in half even once may be an indication that the storage array is oversubscribed, or a system administrator may not consider the storage array to be oversubscribed until the queue depth has been dropped to the lower limit without improvement in the average I/O command completion time. Adding LUs or redirecting data to a new target would have to be performed manually by the system administrator.

The average I/O command completion time is not the only statistic that may be used to determine what is occurring to the LUs within a target. For example, if there is a large disparity between the average I/O command completion times of LUs in the same target, for a similar I/O load, this is an indication of starvation (unfairness in the average I/O command completion times for LUs within a target). Starvation usually applies to a few LUs out of many, and occurs due to unfairness of the I/O scheduler in the operating system, above the driver. However, the driver is not in control of fairness in terms of I/O scheduling, and thus can only detect a lack of fairness, not restore it. Changing fairness is something that the system administrator must do manually.

The counts in the individual buckets may also provide an indication of what is happening within a LU. For example, a bell curve centered at a particular average I/O command completion time may be expected, but if there is a spike at some unexpected completion time, this may indicate a specific problem requiring LU maintenance. In other words, the nature of the distribution of counts in the buckets for a LU may provide an indication of what is happening in the LU, and more generally, what is happening at the target level, which is what the FC transport protocol cares about. (The application cares about the LU level.) Again, any adjustments made as a result of the nature of the distribution of counts in the buckets for a LU must be made manually by the system administrator.

In addition, if a LU isn't as available as other LUs, as evidenced by a high average I/O command completion time for that LU as compared to other LUs, other LUs with a higher limit should be used. However, a system administrator would have to manually intervene and make a decision to change the storage allocation and/or move data from one LU to another.

The invention can be extended to multiple initiators and multiple targets. Statistics can be obtained for all initiators and all targets so that a system administrator can determine which targets are overloaded and which initiators are affected. In other words, it can be extended across the entire SAN. All existing tools do not and cannot have this extension capability because they are all applicable only to direct attached storage.

A system administrator may want to work from a single terminal on a single host and evaluate I/O command completion time data for all hosts in the SAN and all of the LUs, targets and ports in the SAN. Emulex Corporation's HBAnyware™ management suite, in its current configuration, keeps track of how HBAs are performing, how they are configured, enables HBAs to be configured remotely, and allows reports to be sent to remote locations on the network. HBAnyware™ can be extended in view of embodiments of the present invention to poll the average I/O command completion time and other information from the driver of each host within which HBAnyware™ is running and present it to the system administrator at a remote location in graphical or tabular form as described above so that a system administrator can see all of this LU loading information for the entire SAN and make adjustments accordingly. HBAnyware™ has a routine running in each driver that reports back, in-band, to the host within which the HBAnyware™ software is running. HBAnyware™ can communicate with all of the HBAs on each host, collect the data for each of the buckets for each LU, and send this data back to the host within which the HBAnyware™ software is running.

In addition, instead of having the driver detect an increasing average I/O command completion time and an upcoming overload condition and set the queue depth automatically, the adjustments to the queue depths could also be done by a system administrator using HBAnyware™ and communicated back to each of the drivers. The latency information, in its histogram form, can also include information about the amount of I/Os being completed by the target and LUNs. Monitoring this volume is also interesting from a diagnostic standpoint. For example, four load-balanced HBAs, in the same server, should show similar volume to a given target/LUN. However, if the volume is quite different, the load balancing software is either malfunctioning or not configured correctly.

It should be understood that all operating systems have some ability to measure completion times. However, embodiments of the invention further allow for the collection and management of the completion times for all servers in a data center, or some logical subset (i.e., all servers associated with a particular application), to provide trending, comparisons, and the discernment of acceptable and unacceptable response times. By comparing across multiple servers and trending over time, good and bad latency can be determined. In addition, the ability to observe latency for all servers associated with a given application can be helpful when diagnosing a performance problem with that particular application. In general, any servers whose latency falls significantly outside the average latency of the other servers, especially after being newly added to the system, can be targeted as possibly malfunctioning.

Embodiments of the invention also provide the ability to integrate protocol error data, capacity (queue) data and latency data. For example, protocol errors that do not affect latency or volume of I/O can be ignored. Protocol errors that do affect latency or volume can also be prioritized.

Collection of Selected Negative Event Data

The second embodiment of the present invention to be discussed in greater detail relates to the use of remote agents embedded in initiators and a network diagnostics manager application for collecting specific interesting negative initiator event data (diagnostics data) to enable a picture of the operational health of the SAN to be determined. To better identify problem areas in the network, agents are placed in servers acting as initiators in the SAN. The agents interact with relatively inexpensive HBAs, NICs or adapters (referred to herein as I/O controllers) to collect initiator event data rather than relying on expensive test box hardware. Although termed "initiator event data," the collected event data doesn't necessarily relate to the initiator but may relate to other parts of the network such as the switches and targets (disk drives). A benefit of collecting initiator event data is that no direct access (and associated access rights) to the network or storage components is needed to collect this data. Although HBAs are primarily intended to transfer data over a FC link, embodiments of the present invention implement firmware modifications to utilize the HBAs for gathering certain event data. HBAs are ideal for gathering event data because each HBA has visibility to parts of the network that other entities cannot see. Each agent collects the event data from the HBA through the HBA driver stack and sends the collected data to a network diagnostics manager in a centralized management server or a plurality of distributed servers so that a picture of the SAN can be pieced together that any one individual server would not ordinarily be able to see. The agents can also collect, from local drivers in the HBAs of the servers, errors and performance data seen at the HBAs (e.g., throughput problems, etc.).

This data is periodically pulled from the agents by a network diagnostics manager and stored in a database, where it can be accessed by a base application. With this collected information, an overall picture of the network performance can be pieced together, and the SAN can be diagnosed based on what the initiators have seen. The network diagnostics manager can integrate I/O data from the OS, the initiator stack, network, and storage devices to create information and add value. This integration of data can enable the system to determine which errors to ignore, and which ones to pay attention to.

Unlike conventional SAN diagnostics systems, embodiments of the present invention provide a number of nondisruptive smart agents scattered about the network and capable of being activated when needed and selectively configurable to look for only a certain number of data items and store them in memory, and periodically send this information back to a central location so that a picture of what is happening in the SAN can be developed. Although the information being collected at any one particular HBA by itself may not be enlightening, the collection of information being gathered by a number of HBAs can reveal the trouble spots in the network.

As noted above, existing software-based SAN diagnostics tools are only able to collect counter information and/or high-level event data. Counters are good at showing trends but are not effective, and sometimes misleading, when attempting to determine root cause of SAN availability or performance issues. Relying on SAN counters for troubleshooting a SAN is akin to counting the average number of cars traveling through an intersection over a one week period to determine the root cause of an accident that happened on a particular day and time. High-level events can also be problematic in helping determine root cause. The high-level events can be intentionally induced by the end-user, or they can simply be a symptom of a problem, not the root cause. On the other hand, continuing the analogy above, collecting protocol-based negative event data in accordance with embodiments of the present invention is akin to obtaining information that a car with a particular license plate number ran a red light (a protocol violation) at the time of the accident.

Unlike existing SAN diagnostics tools that create performance degradation due to their collection of massive amounts of data, embodiments of the present invention may cause no additional performance degradation by the collection of only interesting negative event data, because performance is already degraded at this point in time.

Furthermore, the counter information collected by existing SAN diagnostics tools is just a number, and only is associated with time from the perspective of when they were read. Because counters don't have time information, they must be monitored constantly, which can have a negative performance impact. In contrast, the SAN diagnostics tool according to embodiments of the invention sends "stateful" information back, related to time.

In addition, existing SAN diagnostics tools can only provide counter data indicating, for example, the number of bytes being received by an HBA, with no visibility at the driver level. However, embodiments of the present invention can make requests of the driver itself, such as observed performance indications (e.g., a latency timer starts when the request is made, and stops when a completion message is received). These performance indications can reveal previously undetectable performance issues at the driver level.

Also, unlike existing hardware-based SAN diagnostics tools that must be moved around from HBA to HBA and cannot develop a big picture of the network, embodiments of the present invention do not require hardware, just downloadable drivers, APIs and agents, and can collect the specific kind of data needed to develop a big picture of the network.

Unlike HBAnyware, which collects configuration information about the HBAs, the data collected according to embodiments of the invention, although collected at the initiator, doesn't relate to the initiator but relates to other parts of the network such as the switches and/or targets.

Figure 4A:
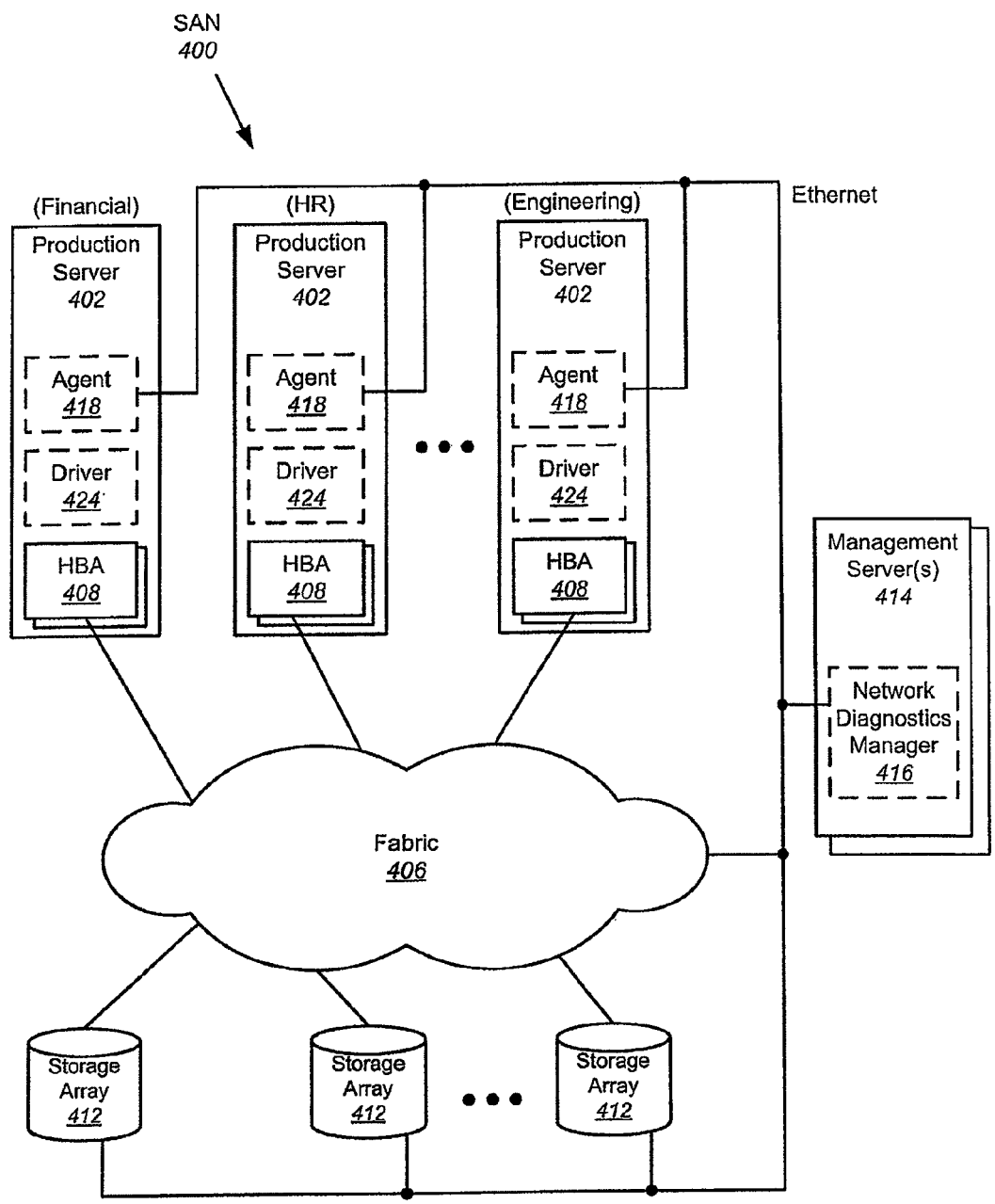
FIG. 4a illustrates an exemplary SAN in an enterprise data center according to embodiments of the invention.

FIG. 4a illustrates an exemplary SAN 400 in an enterprise data center according to embodiments of the invention. In the example of FIG. 4a, a number of production servers 402, each executing one or more applications (e.g. financial, human resources, or engineering applications), are connected to a fabric 406. Each production server 402 contains one or more HBAs (I/O controllers) 408, an initiator device driver stack 424, and an agent 418. The production servers 402 can communicate with one or more storage arrays 412 over the fabric 406, which can include, but is not limited to, FC, Ethernet, and Infiniband.

The SAN 400 also includes one or more management servers 414 executing network diagnostics manager software 416 for configuring the speed of the fabric (e.g., the speed of the links), zoning, etc. The network diagnostics manager 416 may be stored in computer-readable storage media and executed by one or more processors in the server. The network diagnostics manager 416 may receive link information (which is analogous to the "pulse" of the SAN 400, indicating that there is activity occurring), and throughput information (which is analogous to the "blood pressure" of the SAN, where excessively high or low throughput can indicate problems). The network diagnostics manager 416 is responsible for configuring the storage arrays (e.g., mapping LUNs in the storage arrays to production servers, configuring the size of the logical LUNs, etc.). The network diagnostics manager 416 may monitor the capacity of the storage arrays 412 and receive localized latency measurements (e.g. how long it took to complete a particular command at the storage array). HBAnyware™, as mentioned above, can also be executed within the one or more management servers 414.

Figure 5:
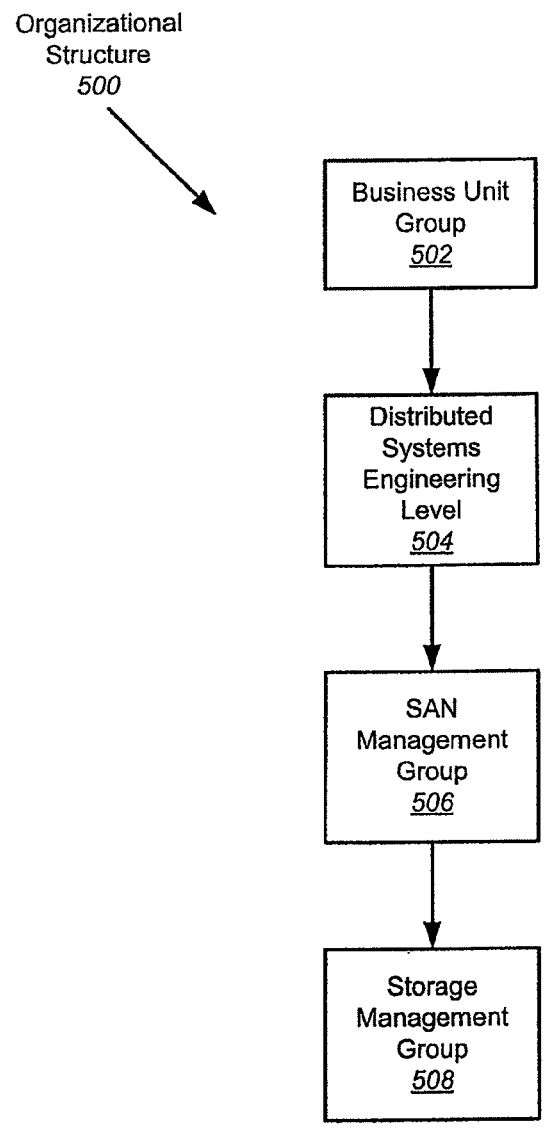
FIG. 5 illustrates an exemplary organizational structure of an enterprise data center.

FIG. 5 illustrates an exemplary organizational structure 500 of an enterprise data center. Conventional SAN diagnostics software has drawbacks in that it can only provide high level information and does not have access to lower level information. So, for example, in FIG. 5, an application performance issue appearing at a business unit group 502 (which provides the applications) may be passed down to the distributed systems engineering level 504 deploying Linux, Windows, Solaris servers and the like for resolution, but those involved at the distributed systems engineering level may not have ready access to the lower level information (only available at the SAN management group level 506 or storage management group level 508) to diagnose the problem, and therefore must rely on diagnostics information received from those groups. However, information received from the SAN management group 506 or storage management group 508 individually may not reveal the source of the problem. Thus, the agents mentioned above are utilized in embodiments of the present invention to automatically collect this lower level event data.

Figure 4B:
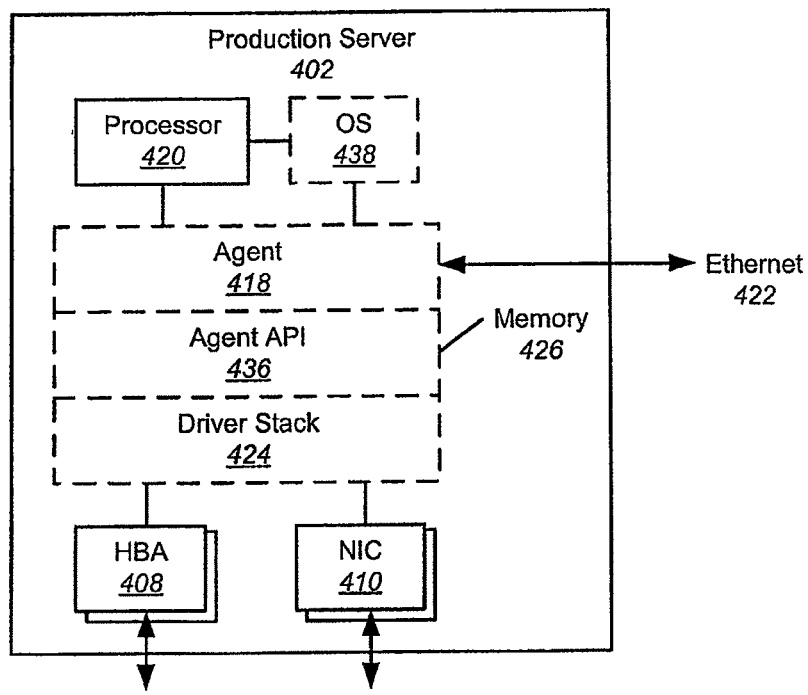
FIG. 4b illustrates an exemplary production server in greater detail according to embodiments of the invention.

FIG. 4b illustrates an exemplary production server 402 in greater detail according to embodiments of the invention. Each production server 402 includes HBA 402 and/or Network Interface Card (NIC) 410, generally referred to herein as I/O controllers, and an initiator driver stack 424 that may be stored in memory (computer-readable storage media) 426 and executable by processor 420. In order to selectively capture interesting negative initiator event data, each production server 402 includes an agent 418 that can be stored in computer-readable storage media 426 and executed by the server processor 420. The agent 418 may be downloaded, activated, deactivated, configured or upgraded using the network diagnostics manager 416 executing in the one or more management servers 414 through out-of-band channels 422 (e.g., over the Ethernet) to collect a configurable subset of information such as selected initiator event data. End users may independently perform these tasks as well. The agents can be either installed separately or delivered within a software download. The driver stack is tailored by adding an agent API 436 to facilitate communications between the agent 418 and the initiator driver stack 424.

It is significant to note that the agents 418 capture data at the initiators (production servers 402) that is already being generated, and provide the data to the network diagnostics manager 416 in a format that shows how the initiator, connected fabric devices, and targets are performing. Although collected at the initiators, all the data doesn't relate to the initiator itself. The agents 418 cooperate with the existing initiator driver stack 424 and collect the information from the driver stack. A portion of memory 426 in the server 402 stores the data collected by the agent 418. However, if the local memory 426 exceeds a certain capacity threshold, the agent 418 can proactively communicate with the network diagnostics manager 416 through the collector 430 to request that it be serviced.

Figure 4C:
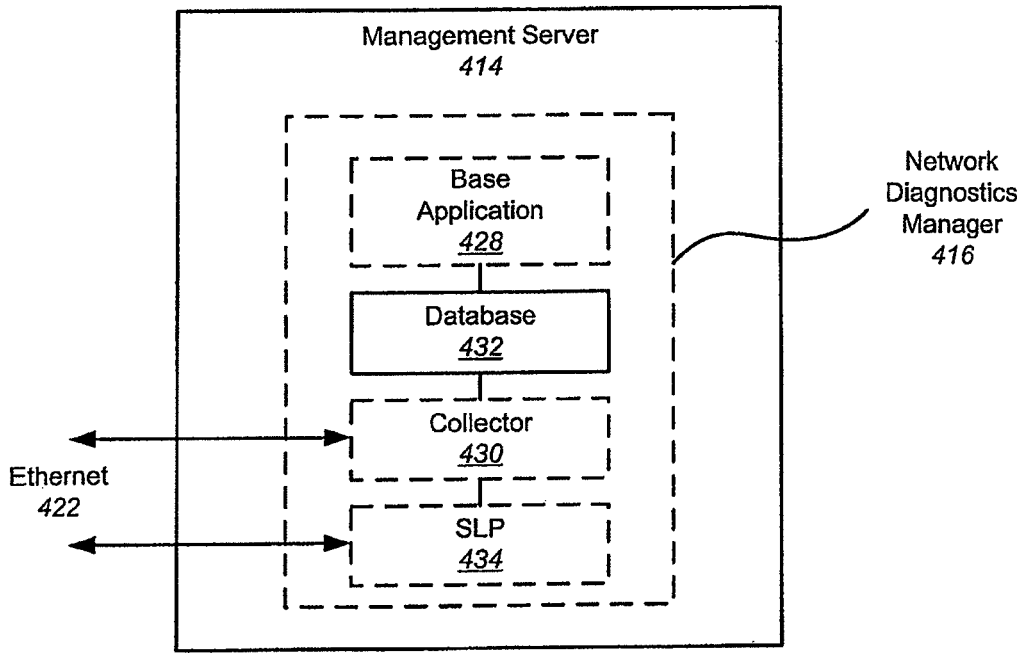
FIG. 4c illustrates an exemplary management server in greater detail according to embodiments of the invention.

FIG. 4c illustrates an exemplary management server 414 in greater detail according to embodiments of the invention. As illustrated in FIG. 4c, the network diagnostics manager 416 includes a base application 428 (the network diagnostics software), one or more collectors 430, a database 432, and a Service Locations Protocol (SLP) interface 434. The agents 418 communicate with the SLP interface 434 over the Ethernet 422 to identify what type of agent they are. In embodiments of the present invention, for example, all agents 418 having the capabilities described above may be identified as being of the same agent type. The collectors 430 communicate with the SLP interface 434 to identify all of the agents 418 of a certain type. In this way, the collectors 430 do not have to broadcast over the network to identify the agents 418. The collector 430 pulls data from the sensors/agents 418 over the Ethernet 422 on a periodic basis, and stores the data in the database 432. The collected data represents a system-wide view. The data can then be accessed by the base application 428, which performs a recording engine function. The base application 428 may be accessible through a web server to enable a system administrator to retrieve specific data, generate reports, and diagnose network problems.

The base application 428, through the collector 430, can communicate with the agent 418 through a messaging protocol to configure the agent to collect only certain types of event data and store it in the special memory 432. Periodically, on a configurable basis, the collector 430 polls the agent 418, which then retrieves the data from the special memory 426 and sends it to the collector 430.

In one embodiment of the present invention, an initially inactive agent 418 can be downloaded into a production server 402. The agents 418 can be included in driver kits (containing drivers, industry standard APIs, HBAnyware™, etc.), so that when the kit is installed, the agents are also installed and are ready to be awakened. In addition, the initiator driver stack 424 can be tailored so that if an agent 418 is ever awakened, the agent can be immediately accessible to the OS. An agent API 436 can be downloaded and placed into initiator driver stack 424 so that an end user does not have to update the driver stack to get the benefit of the agents when they are activated. In this way, nothing needs to be added to production servers 402 to enable them to interact with the agents 418. These inactive agents 418 can collect nothing until a command is received to activate them and enable them to collect only certain kinds of event data. This data can be saved into memory 426, and periodically sent back to the network diagnostics manager 416.

Figure 6:
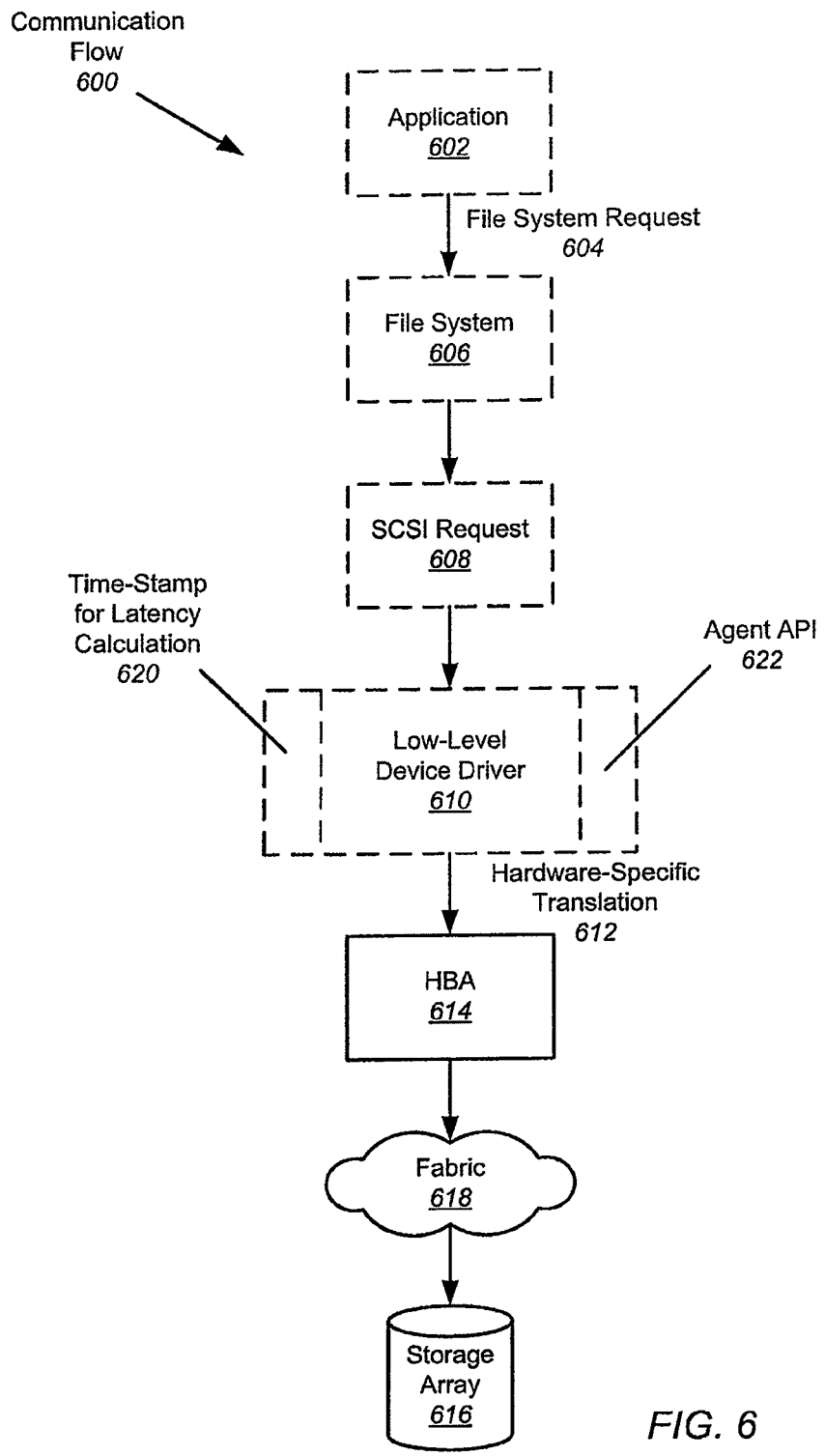
FIG. 6 illustrates an exemplary communication flow between software and hardware elements according to embodiments of the present invention.

FIG. 6 illustrates an exemplary communication flow 600 between software and hardware elements according to embodiments of the present invention. As mentioned above, to implement embodiments of the present invention, changes are needed to the initiator driver stack. Previously, data was just being acted on, but with embodiments of the present invention the data now needs to be converted to a form that can be collected by the agent, and the agent has to be tailored to know where to collect this information from in the stack. Referring to FIG. 6, an application 602 running on a production server may send a file system request 604. The file system 606 then converts this request to a SCSI request 608, which is passed down to a low-level device driver 610. The low-level device driver 610 creates a hardware-specific translation 612 for the HBA 614 it services. The HBA 614 then communicates with a storage array 616 through the fabric 618.

To implement the first embodiment of the present invention involving latency measurements, the low-level device driver 610 must be modified at 620 to time stamp both the outgoing I/O request and the incoming I/O completion. To implement the second embodiment of the present invention involving the collection of interesting negative event data, the low-level device driver 610 must be modified to include an agent API 622 to act as an interface with the agent and allow the agent to obtain the latency and negative initiator event data from the driver. The agent API 622 can be stored in computer-readable storage media and executed by one or more processors in the server.

Referring again to FIG. 4b, the agents 418 can work with any HBA 408 or I/O controller, provided that the proper commands are sent to the initiator driver stack 424. In other words, the agents 418 have to ask the right questions (specific or general or OS questions) of a particular HBA 408 through the initiator driver stack 424. The agent 418 can first send vendor-unique API commands to the driver stack 424, and if those fail, either because the HBA 408 is from a different vendor or because the driver stack is outdated, the agent can revert to either open standard APIs or Operating System APIs to communicate with the driver stack and HBA.

As mentioned above, the network diagnostics system according to embodiments of the present invention is able to collect both initiator event data and OS data. The SAN diagnostics system of the present invention is based on the fact that the SCSI protocol is an initiator-based protocol. As such, the initiator starts every "conversation" in the SAN, and if any entity between the initiator and the target cannot partake in the conversation or service the request, feedback must be provided back to the initiator. Because a SCSI initiator sees things and issues kinds of commands that SCSI targets don't, and receives feedback, SCSI initiators are in a privileged position. For example, if an initiator sends a command to write a block of data, a switch can respond with a message indicating that the switch is too busy on a particular link to process a request from an initiator at this time. It can be very helpful to be notified of this type of bottleneck, so a message (protocol feedback) is sent back from the switch to the initiator. In another example, feedback can be received from the target itself, indicating that the disk or the target controller is too busy to process a request. The initiator is the only entity that collects feedback related to the overall performance of the network. For example, from an event standpoint and performance standpoint, a switch doesn't have a good perspective on end performance. The switch isn't collecting information from the target on how busy the target is, it is just collecting information on how busy the switch is. Thus, the initiator is the entity most suitable for placing an agent to collect information related to the overall performance of the network.

This feedback, such as whether the SCSI layer or FC layer is too busy, can be extracted from within the initiator's own driver stack by the agent. Note that an agent is not needed in the target's stack, because the central SAN diagnostics manager does not communicate with the target directly. Instead, an agent obtains information from the initiator's stack (which was received from the target).

Initiator event data that may be collected by the sensors/agents can include, but is not limited to, (1) fabric_busy, which is sent back to an initiator by a fabric device to indicate that the fabric is overloaded, (2) queue_full, which is sent back to an initiator by a disk to indicate that a particular LUN can't process any new requests/commands because its queue is full, and (3) SCSI_busy, which is sent back to an initiator by a target to indicate that the target is too busy to process commands. Other initiator event data that may be collected includes a target_reset command, which usually originates from the SCSI stack in a server. Note, however, that if a production server sends out a target_reset command to the target, the target then sends a $3^{rd}$ party logout to every server associated with its logical LUNs. This is disruptive because it puts the other servers out of commission. Still other initiator event data that may be collected includes, but is not limited to, ELS PLOGI (Process Login), ELS LOGO (Logout), ELS PRLO (Process Logout), ELS ADISC (Address Discovery), ELS RSCN (Registered State Change Notification), Link control P_BSY (Port Busy), FCP Read Check Error, SCSI Logical Unit Rest, SCSI Check Condition, SCSI Bus Reset, Queue Depth Changed, Firmware Updated, and Boot Code Updated. As noted above, this type of initiator event data is often much more relevant and interesting to the diagnosis of network trouble than the simple counter data and high-level event data.

This data being collected is initiator endpoint data, not overall performance data. The collected data is exception data from inside the stacks of the initiator, target, and switches. The collected data is selectively chosen to be interesting negative event data, a subset of the data available for collection. No additional performance degradation may be incurred by the collection of such data, because performance is already degraded at this point in time.

Another capability of the agents 418 according to embodiments of the present invention is communicating with the OSs 438 of the servers to gather and report data in ways that are not currently done. The agent 418 running in user space (as opposed to kernel space) gets this data from the OS 438 and sends it back to the network diagnostics manager 416.

The information that can be collected by the agent 418 from the OS 438 includes, but is not limited to, OS events, queue depth, throughput, the number of commands seen during a certain period of time, seconds since last HBA reset, transmitted frames, transmitted words, received frames, received words, LIP count, NOS errors, error frames, dumped frames, link failures, loss of sync, loss of signal, invalid transmit word count, invalid CRC count, disk read bytes per second, and disk write bytes per second.

The embodiment of the present invention currently under discussion has been described above in the context of placing agents in front-end initiators. However, alternatively or additionally, embodiments of the present invention can be extended to back-end initiators. In such embodiments, interesting negative event data can be collected from target stacks within back-end initiators, at the back end of a network appliance filer (a filer front end with a SAN at the back end). For example, in a FC SAN, initiators may be connected through a fabric (including fabric switches) to a storage subsystem having a FC HBA operating in a target mode. Agents could be placed in the storage subsystem to pull negative event data from the target driver stack at the front end of the storage subsystem. With this arrangement, if an initiator determines that the storage subsystem did not fulfill a particular request, the network diagnostics manager could receive data from the target driver stack in an attempt to understand where the storage subsystem is having issues (e.g. cache memory, a fabric issue on back end, etc.).

The event data that can be collected by embodiments of the present invention is not limited to the specific data mentioned above. Embodiments of the present invention include other metrics that would be of interest. For example, the agent could monitor particular error responses in a particular sequence, and note the time of occurrence of each sequence. Collecting this data from a number of locations may produce a meaningful compilation of data. This is just one example of the types of information that can be collected according to embodiments of the present invention.

The embodiment of the present invention currently under discussion could also be implemented in Fibre Channel over Ethernet (FCOE) systems. FCOE is generally compatible with embodiments of the present invention discussed herein because the initiators in FCOE utilize a SCSI initiator stack, and all of the same FC and SCSI event, latency and capacity data (negative event data) can be collected from the initiator stack. Embodiments of the present invention could also apply to iSCSI (more generally, anything utilizing a SCSI stack), NAS and NIC stacks (Ethernet stacks). Embodiments of the present invention could apply to Serial Attached SCSI (SAS) initiators as well, or other protocols where a local stack can be probed for negative event data from remote devices.

Computation of Oversubscription Data

The third embodiment of the present invention to be described in further detail relates to the computation of an oversubscription value based on the demand for a device divided by the handling capacity of the device to help determine whether the device is oversubscribed and changes need to be made.

When SCSI devices are deployed, they are programmed with a command queue depth. This queue depth dictates how many commands can be queued up to the particular device at a given time. If there is demand for more commands and the queue is full, the other commands cannot enter the queue and need to wait for slots to open up. In large data centers, there are thousands of servers accessing thousands of devices. If there is too much demand for a particular device, its queue fills up, and applications must wait to be serviced. If the queue is too overloaded it could, for example, take ten seconds to open an e-mail. As a result, understanding how the queue is utilized is important to understanding looming performance issues.

In a RAID controller the issue is further compounded. In this case, there are hundreds or thousands of devices (such as disk drives) located behind a controller front end. This controller front end has some I/O processing capability that is far less than the I/O processing capability of all the devices it supports. As a result, it is important to understand the I/O demand on the controller as well as on each individual device. In addition, with virtual server technology, more queuing demand is placed on storage controllers, by fewer initiators and servers. Further, the mapping of all the queue demand to the storage controllers is more difficult to discern and aggregate.

Embodiments of the present invention collect, operate on, and display queuing information from thousands of host servers in a data center environment. This is not practical to do manually today, and no other product exists to perform this task. Because this information is not available today, IT administrators are forced to react to performance issues. Often times they must either slow down all the systems (lower the queue depth everywhere) in order to bring the system into some level of predictable performance. Without specific, and system-wide, queuing information it is difficult to maintain peak performance.

For example, if a particular application is experiencing poor performance, understanding the queue depth that it is utilizing would help determine whether the performance issue is I/O-related or application related. If the issue is I/O- related, a common approach includes increasing the queue depth for all the application's storage devices. This has the effect of not only increasing these devices quality of service, but also decreasing the relative quality of service of all other devices being serviced by the same storage front end. Embodiments of the present invention will allow administrators to make more informed choices when addressing these performance parameters.

Figure 7:
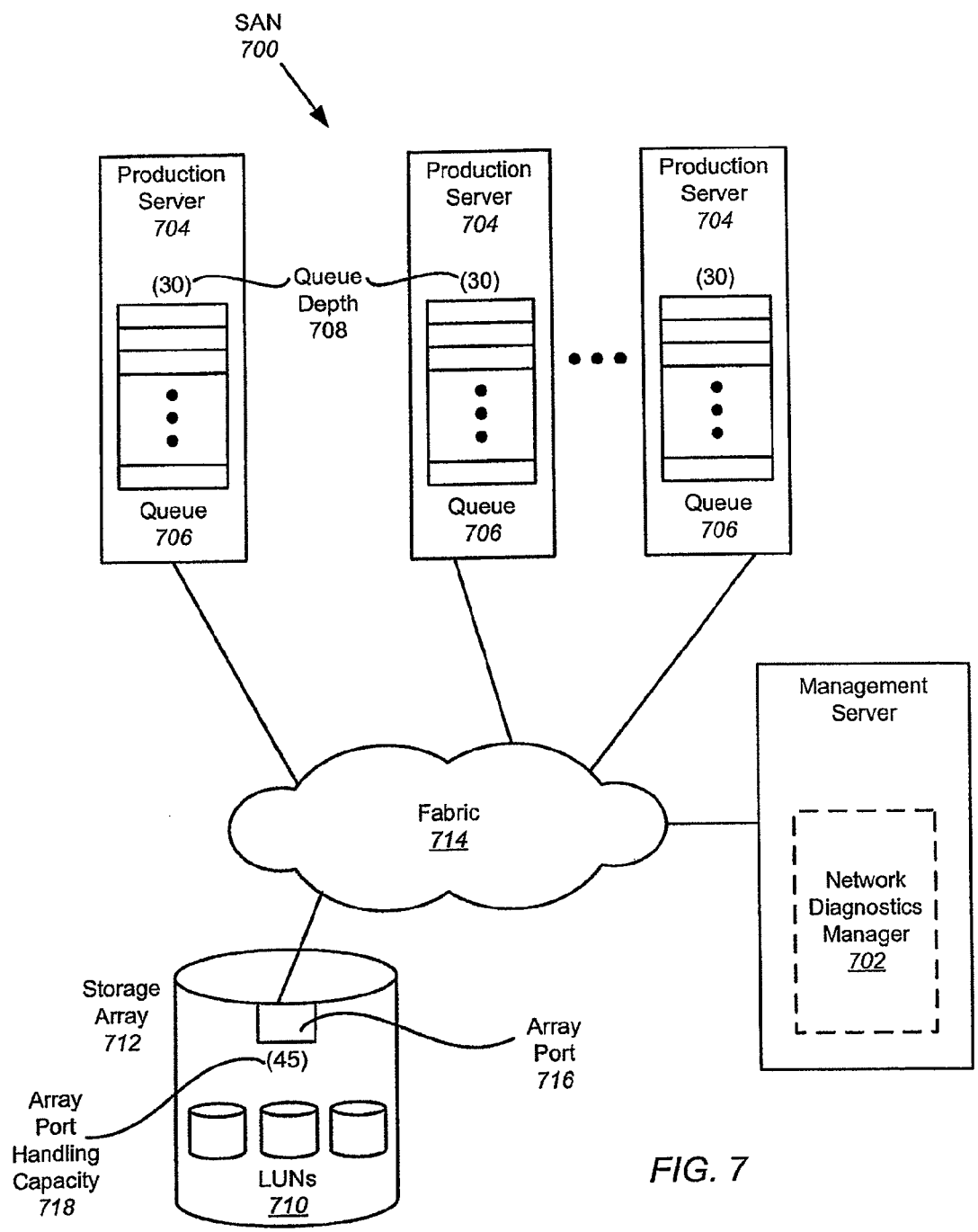
FIG. 7 is an example of a SAN and a SAN diagnostics manager capable of computing an oversubscription value according to embodiments of the present invention.

FIG. 7 is an example of a SAN 700 and a network diagnostics manager 702 capable of computing an oversubscription value according to embodiments of the present invention. In the example of FIG. 7, the production servers 704 contain queues 706 having a certain queue depth 708 for storing commands associated with a particular LUN 710. Each production server 704 may be mapped to a LUN 710 in a storage array 712. The storage array 712 accesses the fabric 714 through an array port 716, which may have a certain handling capacity 718 that is a function of the number of commands that can be simultaneously handled and the memory required for those commands. In the simplified example of FIG. 7, each queue 706 in each production server 704 has a queue depth of 30, but the array port handling capacity 718 is 45. Thus, a computation of a configured oversubscription value as defined by the configured queue depths of the queues in the production servers associated with LUNs being serviced by a particular array port (e.g., 30+30+30 in this example) divided by the maximum array port handling capacity (supply) servicing the logical LUNs (e.g., 45 in this example) yields a configured oversubscription value of 2, which is within acceptable limits (some oversubscription is desirable because the production servers in reality may only have a couple of commands in their queues at any time). However, if the configured oversubscription value should become 20, for example, this can represent a significant oversubscription calling for a reallocation of resources.

In addition to computing a configured oversubscription value, this embodiment of the present invention may compute an actual oversubscription value, which uses the actual queue depths of the production servers divided by the maximum array port handling capacity (supply) servicing the LUNs.

The types of oversubscription ratios that can be calculated according to embodiments of the present invention include, but are not limited to, target Port Oversubscription Value for maximum queue depths, target Port Oversubscription Value for actual queue depths, HBA Oversubscription Value for maximum queue depths, HBA Oversubscription Value for actual queue depths, Device Oversubscription Value for maximum queue depths, and Device Oversubscription Value for actual queue depths.

The above description illustrates that this embodiment of the present invention collects, operates on, and organizes queue information. Embodiments of the present invention can automatically collect the programmed block storage maximum queue depth for every device, sample the block storage actual queue usage for every device, map the queues of every device to storage arrays or controller front-ends, and map maximum and actual per device queue information on a per server, per initiator, per target port, port target, and per device basis. In one embodiment, agents installed in the production servers and the storage arrays can extract this information and send it to a SAN diagnostics manager in one or more management servers over the Ethernet. This information is then organized and displayed (e.g., on a web page accessible over the Internet) in such a manner that the data center administrator can quickly determine if there are issues or opportunities related to queue management.

The system will also provide for alerts when certain measured values approach or surpass configured thresholds (high water marks). The system also establishes a Target Port Oversubscription Value (TPOV) for both the maximum and utilized queue usage. This value is based on the quotient of each of these queue usage measures, summed up for all the devices behind a target port, divided by the I/O handling capability of the storage array. The I/O handling capability of the storage array is either gleaned empirically, or overridden by the end-user based on more expert knowledge of a specific configuration. In other embodiments, reports and trend charts can be produced. With all of the information provided by all of the embodiments of the present invention described above, a system administrator may be able to link performance, via latency measurements, to oversubscription values, or link "array busies" and device queue full events to oversubscription values.

Embodiments of the present invention also extend to the back-end of network attached storage systems (a.k.a. filers). Because many filers are simply specialized server front-ends with SAN back-ends, embodiments of the present invention can be used to monitor the queuing on the backend and provide important performance data to the end user.

Computation of Event Severity Data

The fourth embodiment of the present invention to be discussed in greater detail relates to collecting and logging certain types of event data in a database in a centralized management server, and computing a system severity value indicative of the level of impact (criticality or severity) of each event. In this embodiment, the data is collected at the driver level by the agents, and stored in the special memory in the production servers. When the collector polls the production servers, I/O scope (low level events) are collected and centralized in a database. The base application can utilize this data to generate a severity calculation based on a predetermined severity level along with some collected data such as the number of servers affected by a target reset command.

Figure 8:
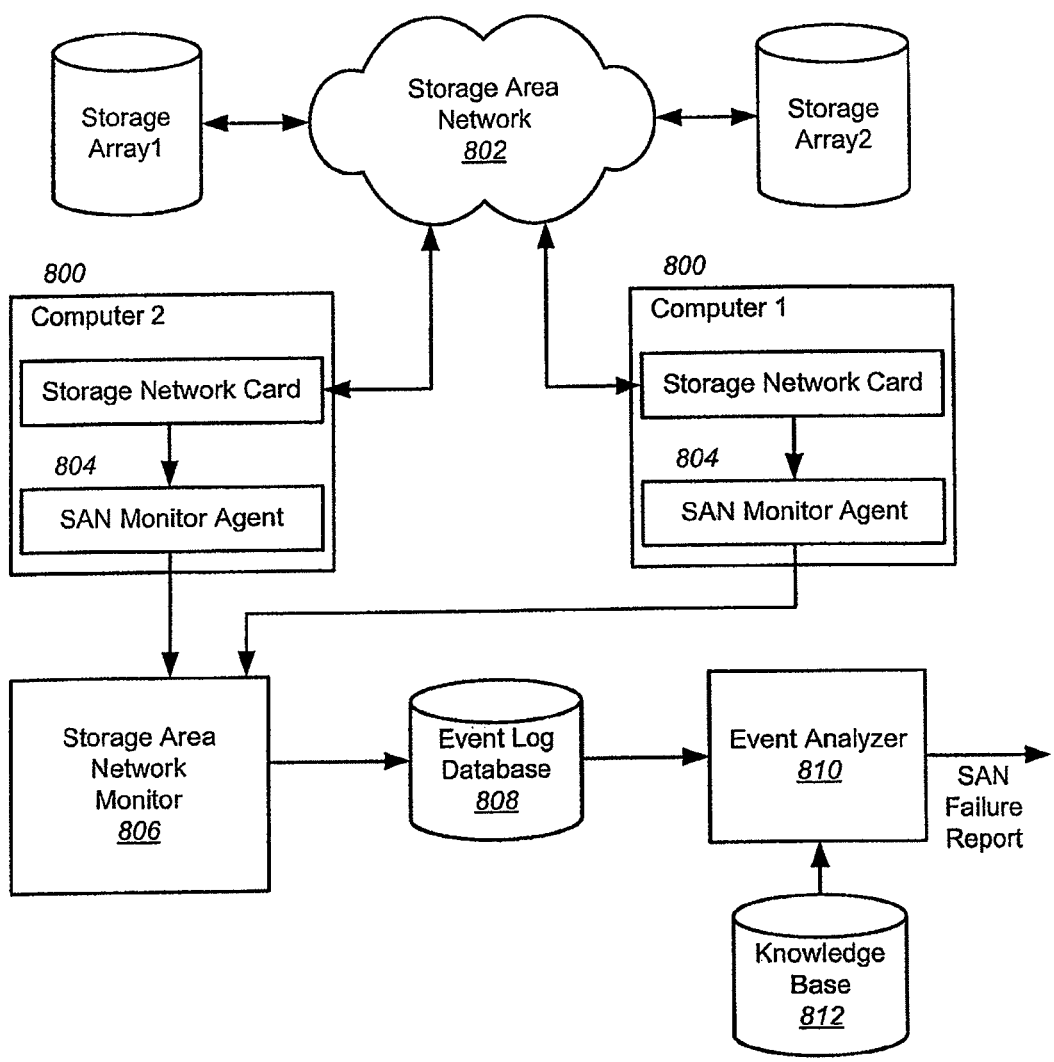
FIG. 8 illustrates an exemplary SAN implementing severity data collection system according to embodiments of the present invention.

FIG. 8 illustrates an exemplary SAN 802 implementing severity data collection system according to embodiments of the present invention. As shown in FIG. 8, each computer 800 (which can be equated to server 402 in FIG. 4a) connected to the Storage Area Network (SAN) 802 runs a Storage Area Network Monitor Agent 804 (which can be the same as or additional to agent 418 in FIG. 4a). This agent 804 continuously monitors for storage network protocol events that include, but are not limited to, Discovery events, Task Management commands, Link events, SCSI errors, and Change in data access performance. This monitoring can be performed with minimal or zero effect on system performance. Each one of these events can adversely affect the availability and performance of the SAN 802. Discovery events can indicate, for example, that an application's storage is no longer available. Task Management events can indicate that a storage controller is experiencing intermittent hardware problems, potentially leading to loss of storage access for several servers. Link events can also indicate loss of access, or degraded access to the SAN 802. SCSI errors can indicate loss of access, or degraded access to the SCSI devices attached to the SAN 802. When any Storage Area Network monitor agent 804 detects an event, it sends information about the event to the Storage Area Network Monitor 806 (which can be equated to the network diagnostics manager 416 in FIG. 4a) that includes, but is not limited to, Type of the event, Event Severity, Time stamp of the event, Identifier of the initiator's network hardware, and port, which experienced the event, Identifier of the Storage system, and port, which saw the event, and Attributes of the event. This information allows for automatically correlating multiple events from multiple servers.

When the Storage Area Network Monitor 806 receives such event information from an agent 804, the Storage Area Network Monitor logs this information to the Event Log Database 808 (which can be equated to database 432 in FIG. 4c). This allows root cause of any severe events to be investigated immediately, as opposed to awaiting another failure scenario after enabling logging. As part of populating the Event Log Database 808, a System Severity field or value will be calculated as described above. System Severity will consider the level of impact for each event on other SAN elements. For example, a link event on one of four links to a server is not as critical as a link event to a server with a single link. Likewise, a downed target that has two servers connected to it likely has less impact than a target that has thirty servers connected to it.

The Event Log Database 808 contains event information from the entire SAN 802 as a SAN-wide protocol analyzer for root cause analysis. The Event Analyzer 810 operates in two modes, Manual Mode and Knowledge Base Mode. In Manual Mode, the Event Analyzer 810 presents several filtering and sorting options to the end-user. Multiple SAN events can be filtered to investigate events associated with particular initiators, particular storage arrays, particular times of day, etc. Sorting can also be utilized to perform time-based sorts, storage port sorts, etc. This manual mode will allow capture of problematic SAN events, along with the filtering and sorting tools to quickly identify the root cause of the event.

In the Knowledge Base mode, all related events are linked together by the Event Analyzer 810 and presented, based on a knowledge base of information 812, to the user as a single failure. In this manner, seemingly disparate events can be correlated to help indicate root cause. For each failure presented to the user, information also is presented to the user that includes, but is not limited to, Number of computers affected by the failure, Number of storage ports affected by the failure, Severity of the SAN failure, and a list of potential root causes based on the knowledge base 812.

All the above provides a better method to root cause SAN issues. Having the ability to immediately view SAN-wide protocol events in the aftermath of an incident provides faster resolution of critical problems. Having the ability to capture protocol events by means of the storage adapter also eliminates the need to place a network sniffer on every suspect path. This provides a cheaper mechanism to root cause SAN issues. Furthermore, a major benefit of integrating I/O data from the OS, the initiator stack, network, and storage devices is to create information and add value. This integration of data can enable the system to determine which errors to ignore, and which ones to pay attention to. For example, if the collected data indicates that the storage array is busy but that latency is acceptable, the system can ignore any detected errors. Another benefit is the ability to collect all data from a production server with no need for access rights to the network or storage components. The I/O data can also be used in a predictive manner to allow for the prevention of problems before they occur. For example, the collected information can include the various ways (network paths) that an I/O request can access a target. By observing the latency data and the negative events, it may be possible to determine when one or more of these I/O paths are lost. An alert can be generated when the number of I/O paths is reduced to some threshold (e.g., one path). Such an alert would allow an administrator to restore the lost paths. Currently such an alert is only available for physical network paths and not I/O paths, and I/O paths can be lost even though physical networkspaths are not. Such is the case when a the I/O path is lost within the target device, even though the physical network path to the target device is operational. The only alert is when all paths are lost.

In another example, an alert can be generated if a Queue Full event came back a certain number of times (e.g., 25 times) in a minute, or if the latency for a particular initiator/target port pair exceeds an average of a certain amount of time (e.g., 100 ms) over a given sample period (e.g., one hour).

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system for collecting information related to I/O performance, comprising:
a plurality of servers, each server including an input/output (I/O) controller configured as an initiator in the network, an agent configured for collecting initiator event data related to the performance of the network, and an initiator driver stack tailored for enabling communications between the agent and the I/O controller; and
a network diagnostics manager configured for periodically polling the agents and collecting the initiator event data from the plurality of servers to assist in determining root causes of network performance issues,
wherein the network diagnostics manager comprises:
a service locations protocol (SLP) interface operable to communicate with the agents to determine an agent type;
a collector operable to communicate with the SLP interface to identify one or more agents of a particular type and operable to periodically poll one or more agents to collect the initiator event data;
a database operable to store the initiator event data; and
a base application operable to retrieve the initiator event data.

2. The system of claim 1, the agents further configured for collecting different types of event data at different times in response to commands received from the network diagnostics manager.

3. The system of claim 1, the agents further configured for receiving commands from the network diagnostics manager for one or more of activating, deactivating, configuring, and upgrading the agent.

4. The system of claim 1, further comprising an agent application programming interface (API) in each server configured for enabling communications between the initiator driver stack and the agent in the server.

5. The system of claim 1, wherein the initiator event data is protocol-based negative event data.

6. The system of claim 5, wherein the protocol-based negative event data includes one or more of error messages and observational performance information received from a target.

7. The system of claim 5, wherein the protocol-based negative event data includes one or more of error messages and observational performance information received from a switch.

8. The system of claim 1, the network diagnostics manager located in a centralized management server.

9. The system of claim 1, the agents further configured for requesting servicing from the network diagnostics manager if an amount of collected initiator event data exceeds a threshold.

10. The system of claim 1, the agents further configured for communicating with the initiator driver stacks using one or more of vendor-unique, open standard, and operating system API commands.

11. The system of claim 1, the agents further configured for collecting performance information seen at the servers from operating systems of the servers.

12. The system of claim 1, the network diagnostics manager configured for integrating performance data from an operating system (OS), the initiator driver stack, the network, and storage devices to determine which errors to ignore and which errors to address.

13. The system of claim 1, the agent configured for collecting initiator event data free of a need for access rights to the network or storage components.

14. A storage area network comprising the system of claim 1 and a plurality of storage arrays.

15. The system of claim 1, the network diagnostics manager further configured for collecting and managing I/O completion times for at least some of the plurality of servers to enable trending, comparisons, and identification of servers having unacceptable latency.

16. The system of claim 15, the network diagnostics manager further configured for integrating protocol error data, capacity data and latency data to enable the selective disregarding of protocol errors that leave latency or I/O volume unaffected.

17. The system of claim 15, the network diagnostics manager further configured for utilizing latency data including information about an amount of I/Os being completed by a target and logical units (LUNs) to determine whether load balancing software is operating properly.

18. The system of claim 16, the network diagnostics manager further configured for utilizing the integrated data in a predictive manner to prevent problems before they occur.

19. The system of claim 18, wherein the integrated data includes various network paths through which a server can access a target, and wherein the network diagnostics manager is further configured for determining when one or more of the various network paths is lost from the latency data and the protocol error data.

20. The system of claim 19, the network diagnostics manager further configured for generating an alert when a number of operational paths is reduced to a particular threshold.

21. The system of claim 17, the network diagnostics manager further configured for generating an alert if a Queue Full event came back a predetermined number of times in predetermined time interval.

22. The system of claim 17, the network diagnostics manager further configured for generating an alert if the latency for a particular initiator/target port pair exceeds a predetermined average over a given time interval.

23. The system of claim 1, wherein:
each agent is further configured for collecting a maximum configured queue depth of queues in the servers associated with logical units (LUNs) being serviced by a particular array port, and a maximum array port handling capacity; and
the network diagnostics manager is further configured for computing a configured oversubscription value as the configured queue depths of the queues in the servers associated with a LUN being serviced by a particular array port divided by the maximum array port handling capacity.

24. The system of claim 1, wherein:
each agent is further configured for collecting an actual queue depth of queues in the servers associated with logical units (LUNs) being serviced by a particular array port, and a maximum array port handling capacity; and
the network diagnostics manager is further configured for computing an actual oversubscription value as the actual queue depths of the queues in the servers associated with a LUN being serviced by a particular array port divided by the maximum array port handling capacity.

25. The system of claim 1, the network diagnostics manager further configured for providing an alert when one or both of a configured oversubscription value and an actual oversubscription value exceeds a predetermined threshold.

26. The system of claim 1, the network diagnostics manager further configured for computing a system severity value indicative of a level of impact for selected collected event data.

27. A method for collecting information related to network performance from a plurality of servers in the network, comprising:
configuring an input/output (I/O) controller in each server as an initiator;
employing an agent in each server for collecting initiator event data related to the performance of the network;
tailoring an initiator driver stack in each server to enable communications between the agent and the I/O controller and collecting the initiator event data from the I/O controller; and
identify all agents of a particular type;
periodically polling the agents by a network diagnostics manager to gather the initiator event data and assist in determining root causes of network performance issues
storing the initiator event data; and
retrieving the initiator event data.

28. The method of claim 27, further comprising collecting different types of event data at different times at each agent in response to commands received from the network diagnostics manager.

29. The method of claim 27, further comprising receiving commands at each agent from the network diagnostics manager for one or more of activating, deactivating, configuring, and upgrading the agent.

30. The method of claim 27, further comprising enabling communications between the initiator driver stacks and the agents using an agent application programming interface (API).

31. The method of claim 27, wherein the initiator event data is protocol-based negative event data.

32. The method of claim 31, the protocol-based negative event data including one or more of error messages and observational performance information received from a target.

33. The method of claim 31, the protocol-based negative event data including one or more of error messages and observational performance information received from a switch.

34. The method of claim 27, further comprising collecting information related to the performance of the network free of hardware modifications in the servers.

35. The method of claim 27, further comprising centralizing the network diagnostics manager in a single management server.

36. The method of claim 27, further comprising:
at the network diagnostics manager,
communicating with the agents to determine an agent type,
identifying all agents of a particular type and periodically polling the agents to collect the initiator event data, and
storing the initiator event data in a database.

37. The method of claim 27, further comprising initiating communications with the network diagnostics manager from an agent to request servicing if an amount of initiator event data collected by the agent exceeds a threshold.

38. The method of claim 27, further comprising downloading the agents in an initially inactive state into the servers.

39. The method of claim 27, further comprising establishing communications between the agents and the initiator driver stacks using one or more of vendor-unique, open standard, or operating system application programming interface (API) commands.

40. The method of claim 27, further comprising establishing communications between the agents and an operating system of the servers for collecting performance information seen at the servers.

41. The method of claim 27, further comprising integrating performance data from an operating system (OS), the initiator driver stack, the network, and storage devices to determine which errors to ignore and which errors to address.

42. The method of claim 27, further comprising collecting initiator event data free of a need for access rights to the network or storage components.

43. The method of claim 27, further comprising collecting and managing I/O completion times for at least some of the plurality of servers to enable trending, comparisons, and identification of servers having unacceptable latency.

44. The method of claim 43, further comprising integrating protocol error data, capacity data and latency data to enable the selective disregarding of protocol errors that leave latency or I/O volume unaffected.

45. The method of claim 44, further comprising utilizing latency data including information about an amount of I/Os being completed by a target and logical units (LUNs) to determine whether load balancing software is operating properly.

46. The method of claim 44, further comprising utilizing the integrated data in a predictive manner to prevent problems before they occur.

47. The method of claim 45, wherein the integrated data includes various network paths through which a server can access a target, and wherein the method further comprises determining when one or more of the various network paths is lost from the latency data and the protocol error data.

48. The method of claim 46, further comprising generating an alert when a number of operational paths is reduced to a particular threshold.

49. The method of claim 44, further comprising generating an alert if a Queue Full event came back a predetermined number of times in predetermined time interval.

50. The method of claim 44, the network diagnostics manager further configured for generating an alert if the latency for a particular initiator/target port pair exceeds a predetermined average over a given time interval.

51. The method of claim 27, further comprising:
collecting a maximum configured queue depth of queues in the servers associated with logical units (LUNs) being serviced by a particular array port, and a maximum array port handling capacity; and
computing a configured oversubscription value as the sum of the configured queue depths of the queues in the servers associated with a LUN being serviced by a particular array port divided by the maximum array port handling capacity.

52. The method of claim 27, further comprising:
collecting an actual queue depth of queues in the servers associated with logical units (LUNs) being serviced by a particular array port, and a maximum array port handling capacity; and
computing an actual oversubscription value as the actual queue depths of the queues in the servers associated with a LUN being serviced by a particular array port divided by the maximum array port handling capacity.

53. The method of claim 27, further comprising providing an alert when one or both of a configured oversubscription value and an actual oversubscription value exceeds a predetermined threshold.

54. The method of claim 27, further comprising computing a system severity value indicative of a level of impact for selected collected event data.

55. A server in a network for collecting information related to network performance, comprising:
an input/output (I/O) controller configured as an initiator in the network;
an initiator driver stack tailored for communicating with the I/O controller; and
an agent configured for communicating with the I/O controller through the initiator driver stack to collect initiator event data related to the performance of the network from the I/O controller and transmit the collected event data to a network diagnostics manager,
wherein the network diagnostics manager comprises:
a service locations protocol (SLP) interface operable to communicate with the agent to determine an agent type;
a collector operable to identify one or more agents of a particular type and periodically poll one or more agents to collect the initiator event data;
a database for storing the initiator event data; and
a base application operable to retrieve the initiator event data.

56. The server of claim 55, the agent further configured for collecting different types of event data at different times in response to commands received from the network diagnostics manager.

57. The server of claim 55, the agent further configured for receiving commands from the network diagnostics manager to perform one or more of activating, deactivating, configuring, and upgrading the agent.

58. The server of claim 56, further comprising an agent application programming interface (API) configured for enabling communications between the initiator driver stack and the agent.

59. The server of claim 56, wherein the initiator event data is protocol-based negative event data.

60. The server of claim 59, wherein the protocol-based negative event data includes one or more of error messages and observational performance information received from a target.

61. The server of claim 59, wherein the protocol-based negative event data includes one or more of error messages and observational performance information received from a switch.

62. The server of claim 56, the agent further configured for requesting servicing from the network diagnostics manager if an amount of collected initiator event data exceeds a threshold.

63. The server of claim 58, the agent further configured for communicating with the initiator driver stack using one or more of vendor-unique, open standard, and operating system API commands.

64. The server of claim 56, the agent further configured for collecting performance information seen at the server from an operating system of the server.

65. The server of claim 56, the agent configured for collecting initiator event data free of a need for access rights to the network or storage components.

66. A storage area network comprising a plurality of the servers of claim 56 and a plurality of storage arrays.

67. A method for collecting information related to network performance from a server in the network, comprising:
configuring an input/output (I/O) controller in the server as an initiator;
employing an agent in the server for collecting initiator event data related to the performance of the network;
tailoring an initiator driver stack to enable communications between the agent and the I/O controller and collecting the initiator event data from the I/O controller; and
transmitting the collected event data to a network diagnostics manager;
storing the initiator event data in the network diagnostics manager; and
retrieving the initiator event data from the network diagnostics manager.

68. The method of claim 67, further comprising collecting different types of event data at different times in response to commands received from the network diagnostics manager.

69. The method of claim 67, further comprising receiving commands from the network diagnostics manager for one or more of activating, deactivating, configuring, and upgrading the agent.

70. The method of claim 67, further comprising enabling communications between the initiator driver stack and the agent using an agent application programming interface (API).

71. The method of claim 67, wherein the initiator event data is protocol-based negative event data.

72. The method of claim 67, further comprising collecting information related to the performance of the network free of hardware modifications in the server.

73. The method of claim 67, further comprising collecting initiator event data free of a need for access rights to the network or storage components.

74. The method of claim 67, further comprising initiating communications with the network diagnostics manager to request servicing if an amount of initiator event data collected by the agent exceeds a threshold.

75. The method of claim 67, further comprising downloading the agent in an initially inactive state into the server.

76. The method of claim 67, further comprising establishing communications between the agent and the initiator driver stack using one or more of vendor-unique, open standard, or operating system application programming interface (API) commands.

77. The method of claim 67, further comprising establishing communications between the agent and an operating system of the server for collecting performance information seen at the server.

78. A system for collecting information related to network performance, comprising:
an input/output (I/O) controller configurable as an initiator in the network; and
computer-readable storage media storing
an agent configured for collecting initiator event data related to the performance of the network and transmitting the collected event data to a network diagnostics manager, and
an initiator driver stack tailored for communicating with the agent and the I/O controller and enabling the agent to collect the initiator event data,
wherein the network diagnostics manager comprises:
a service locations protocol (SLP) interface operable to communicate with the agent to determine an agent type;
a collector operable to identify one or more agents of a particular type and periodically poll one or more agents to collect the initiator event data;
a database for storing the initiator event data; and
a base application operable to retrieve the initiator event data.

79. The system of claim 78, the agent further configured for collecting different types of event data at different times in response to commands received from the network diagnostics manager.

80. The system of claim 78, the agent further configured for receiving commands from the network diagnostics manager to perform one or more of activating, deactivating, configuring, and upgrading the agent.

81. The system of claim 78, the computer-readable storage media further storing an agent application programming interface (API) configured for enabling communications between the initiator driver stack and the agent.

82. The system of claim 78, wherein the initiator event data is protocol-based negative event data.

83. The system of claim 78, the agent further configured for collecting initiator event data free of a need for access rights to the network or storage components.

84. The system of claim 78, the agent further configured for requesting servicing from the network diagnostics manager if an amount of collected initiator event data exceeds a threshold.

85. The system of claim 81, the agent further configured for communicating with the initiator driver stack using one or more of vendor-unique, open standard, and operating system API commands.

86. The system of claim 78, the I/O controller forming a part of a server, and the agent further configured for collecting performance information seen at the server from an operating system of the server.

87. A server comprising the system of claim 78.

88. A storage area network comprising the system of claim 78 and further including one or more network switches and a plurality of storage arrays.

89. Non-transitory computer-readable storage media comprising program code for collecting information related to network performance, the program code comprising:
an agent configured for collecting initiator event data related to the performance of the network and transmitting the collected event data to a network diagnostics manager, and
an initiator driver stack tailored for communicating with the agent and the I/O controller and enabling the agent to collect the initiator event data,
wherein the network diagnostics manager comprises:
a service locations protocol (SLP) interface operable to communicate with the agent to determine an agent type;
a collector operable to identify one or more agents of a particular type and periodically poll one or more agents to collect the initiator event data;
a database for storing the initiator event data; and a base application operable to retrieve the initiator event data.

90. The non-transitory computer-readable storage media of claim 89, the agent further configured for collecting different types of event data at different times in response to commands received from the network diagnostics manager.

91. The non-transitory computer-readable storage media of claim 89, the agent further configured for receiving commands from the network diagnostics manager to perform one or more of activating, deactivating, configuring, and upgrading the agent.

92. The non-transitory computer-readable storage media of claim 89, wherein the initiator event data is protocol-based negative event data.

93. The non-transitory computer-readable storage media of claim 89, the agent further configured for collecting initiator event data free of a need for access rights to the network or storage components.

94. The non-transitory computer-readable storage media of claim 92, wherein the protocol-based negative event data includes one or more of error messages and observational performance information received from a target.

95. Non-transitory computer-readable storage media comprising program code for collecting information related to network performance, the program code comprising:
    an agent configured for communicating with an input/output (I/O) controller configured as an initiator in the network through an initiator driver stack to collect initiator event data related to the performance of the network from the I/O controller; and
    a network diagnostics manager configured for polling the agent to gather the collected initiator event data and assist in determining root causes of network performance issues,
    wherein the network diagnostics manager comprises:
    a service locations protocol (SLP) interface operable to communicate with the agent to determine an agent type;
    a collector operable to identify one or more agents of a particular type and periodically poll one or more agents to collect the initiator event data;
    a database for storing the initiator event data; and
    a base application operable to retrieve the initiator event data.

96. The non-transitory computer-readable storage media of claim 95, the agent further configured for collecting different types of event data at different times in response to commands received from the network diagnostics manager.

97. The non-transitory computer-readable storage media of claim 95, the agent further configured for receiving commands from the network diagnostics manager to perform one or more of activating, deactivating, configuring, and upgrading the agent.

98. The non-transitory computer-readable storage media of claim 95, wherein the initiator event data is protocol-based negative event data.

99. The non-transitory computer-readable storage media of claim 95, the agent further configured for collecting initiator event data free of a need for access rights to the network or storage components.

100. The non-transitory computer-readable storage media of claim 98, wherein the protocol-based negative event data includes one or more of error messages and observational performance information received from a target.

101. In a storage area network diagnostic system including servers, server adapters within the servers, and storage systems, the server adapters and storage systems connected in-band to allow data and command messages to flow between the servers and the storage systems, an improvement comprising:
    server adapter drivers within the servers for controlling operations of the server adapters, the server adapter drivers configured to collect performance statistics and error statistics concerning the flow of data and command messages through each server adapter and provide statistics report messages upon request, the statistics report messages containing the collected performance statistics and error statistics; and
    a network diagnostics manager configured for sending requests for statistics report messages to each of the server adapter drivers, and for receiving and processing the statistics report messages in order to produce an indication to a user,
    wherein the network diagnostics manager comprises:
    a service locations protocol (SLP) interface operable to communicate with the server adapter drivers;
    a collector operable to collect the statistics report messages;
    a database for storing information from the statistics report messages; and
    a base application operable to retrieve the information.

102. The improvement to the storage area network diagnostic system of claim 101, wherein:
    the network diagnostics manager is adapted to selectively produce an activation signal and a deactivation signal;
    each server adapter driver has a quiescent mode in which no performance statistics and error statistics are collected and an active mode in which performance statistics and error statistics are collected; and
    each server adapter driver automatically changes to the active mode upon receipt of the activation signal, and to the quiescent mode upon receipt of the deactivation signal.

103. The improvement to the storage area network diagnostic system of claim 101, further comprising:
    storage adapter drivers within the storage systems adapted for controlling the operation of storage adapters within the storage systems, collecting performance statistics and error statistics concerning the flow of data and command messages through each storage adapter, and providing statistics report messages upon request, wherein the statistics report messages contain the collected performance statistics and error statistics.

* * * * *